(12) United States Patent
Damji et al.

(10) Patent No.: US 9,577,846 B2
(45) Date of Patent: Feb. 21, 2017

(54) MBSFN-AWARE ADAPTIVE CHANNEL ESTIMATION

(71) Applicant: Apple Inc., Cupertino, CA (US)

(72) Inventors: Navid Damji, Cupertino, CA (US); Zhu Ji, San Jose, CA (US); Johnson O. Sebeni, Fremont, CA (US); Gaurav Nukala, Sunnyvale, CA (US); Srinivasan Vasudevan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 387 days.

(21) Appl. No.: 14/194,496

(22) Filed: Feb. 28, 2014

(65) Prior Publication Data

US 2014/0241232 A1 Aug. 28, 2014

Related U.S. Application Data

(60) Provisional application No. 61/771,029, filed on Feb. 28, 2013.

(51) Int. Cl.
| | |
|---|---|
| *H04B 17/00* | (2015.01) |
| *H04W 4/06* | (2009.01) |
| *H04L 25/02* | (2006.01) |
| *H04B 17/309* | (2015.01) |

(52) U.S. Cl.
CPC ....... *H04L 25/0226* (2013.01); *H04B 17/309* (2015.01); *H04L 25/0204* (2013.01); *H04W 4/06* (2013.01)

(58) Field of Classification Search
CPC .......................... H04B 17/309–17/364; H04L 25/0202–25/0258; H04W 4/06
See application file for complete search history.

(56) References Cited

U.S. PATENT DOCUMENTS

| | | | | |
|---|---|---|---|---|
| 2010/0323745 | A1* | 12/2010 | Chen | H04W 52/325 455/522 |
| 2013/0121187 | A1 | 5/2013 | Das et al. | |
| 2013/0194940 | A1* | 8/2013 | Li | H04J 11/0023 370/252 |
| 2013/0223256 | A1* | 8/2013 | Choi | H04L 25/0224 370/252 |
| 2015/0181558 | A1* | 6/2015 | Yang | H04L 5/005 370/312 |

* cited by examiner

*Primary Examiner* — Hoon J Chung
(74) *Attorney, Agent, or Firm* — Downey Brand LLP

(57) ABSTRACT

Apparatus and methods for channel estimation in a Multimedia Broadcast Multicast Service (MBMS) Single Frequency Network (MBSFN) are disclosed. A representative method includes a wireless communication device receiving multiple frames, each frame including multiple subframes, each subframe including multiple symbols. The wireless communication device determines whether subframes include MBMS data or not. For subframes that include MBMS data, the wireless communication device excludes all or certain symbols of the subframes that include MBMS data from a channel estimation process. The wireless communication device determines whether the subframes include MBMS data based at least in part on a channel impulse response and/or a channel energy response for one or more symbols of the subframes.

20 Claims, 22 Drawing Sheets

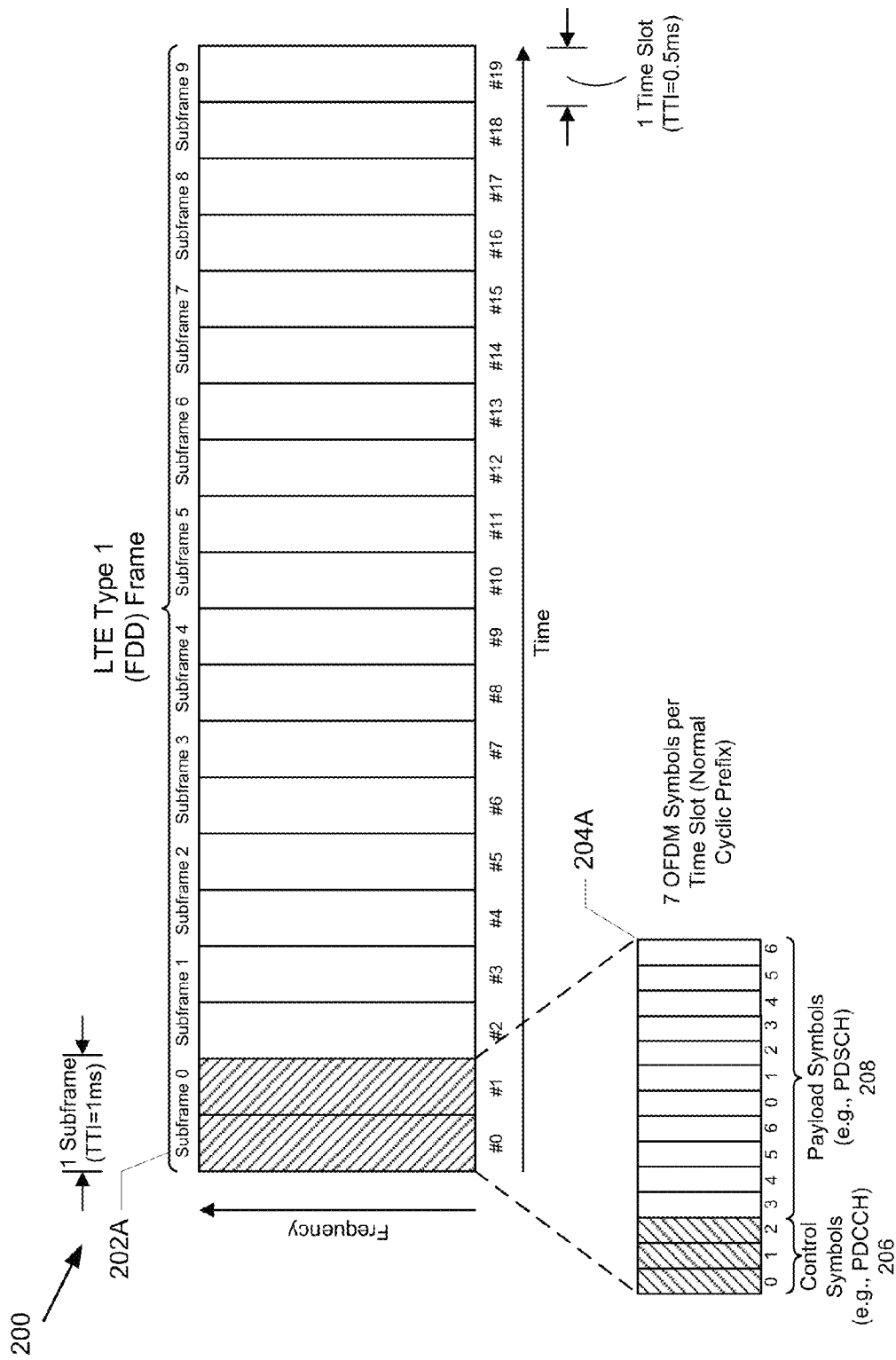

220

| UL/DL Configuration | DL-to-UL Switch Periodicity | Subframe Number ||||||||||
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

D = Downlink Subframe
S = Special Subframe
U = Uplink Subframe

FIG. 2C

| Subframe | No. of OFDM Symbols for PDCCH, when $N(DL,RB) > 10$ | No. of OFDM Symbols for PDCCH, when $N(DL,RB) \leq 10$ |
|---|---|---|
| Subframe 1, 6 LTE Frame Type 2 | 1, 2 | 2 |
| MBSFN Subframe PDSCH Carrier 1 or 2 Antenna Ports | 1, 2 | 2 |
| MBSFN Subframe PDSCH Carrier 4 Antenna Ports | 2 | 2 |
| Subframe Non-PDSCH Carrier | 0 | 0 |
| Non-MBSFN Subframe (Except Subframe 6 for LTE Type 2) Configured With Positioning Reference Signals | 1, 2, 3 | 2, 3 |
| All Other Cases | 1, 2, 3 | 2, 3, 4 |

| Field | Description |
|---|---|
| radioFrameAllocationPeriod radioFrameAllocationOffset | • Radio frames that contain MBSFN subframes occur when SFN mod radioFrameAllocationPeriod = radioFrameAllocationOffset (Eq 1)<br>• Value n1 denotes value 1, n2 denotes value 2, n4 denotes value 4, etc.<br>• When fourFrames is used for subframeAllocation, Eq 1 defines the first radio frame referred to in the description below.<br>• Values n1 And n2 are not applicable when fourFrames is used. |
| subframeAllocation | • Defines the subframes that are allocated for MBSFN within the radio frame allocation period defined by the radioFrameAllocationPeriod field and the radioFrameAllocationOffset field. |
| oneFrame | • Six bit map where a "1" bit value denotes that the corresponding subframe is allocated for MBSFN.<br>• FDD Mapping: First/Leftmost bit defines the MBSFN allocation for subframe #1, second bit for subframe #2, third bit for subframe #3, fourth bit for subframe #6, fifth bit for subframe #7, sixth bit for subframe #8.<br>• TDD Mapping: First/Leftmost bit defines the MBSFN allocation for subframe #3, second bit for subframe #4, third bit for subframe #7, fourth bit for subframe #8, fifth bit for subframe #9, sixth bit not used. Uplink frames are not allocated. |
| fourFrames | • 24 bit map for four consecutive frames where a "1" bit value denotes that the corresponding subframe is allocated for MBSFN.<br>• FDD Mapping: Starting from the first frame and the first/leftmost bit in the bit map, the allocation applies to subframes #1, #2, #3, #6, #7, and #8 in the sequence of 4 frames.<br>• TDD Mapping: Starting from the first frame and first/leftmost bit in the bit map, the allocation applies to subframes #3, #4, #7, #8, and #9 in the sequence of 4 frames. Last four bits not used. Uplink subframes are not allocated. |

SIB2 Information Elements

500

| MBSFN Subframe Configuration List (1 to 8 instances) | Radio Frame Allocation Period |
| --- | --- |
| | Radio Frame Allocation Offset |
| | Subframe Allocation (1 or 4 Frames) |

FIG. 5A

SIB13 Information Elements

510

| | | MBSFN Area Identity |
| --- | --- | --- |
| MBSFN Area Information List (1 to 8 instances) | | Non-MBSFN Region Length |
| | | Notification Identifier |
| | MCCH Configuration | MCCH Repetition Period |
| | | MCCH Offset |
| | | MCCH Modification Period |
| | | Subframe Allocation Information |
| | | Signaling MCS |
| Notification Configuration | | Notification Repetition Coefficient |
| | | Notification Offset |
| | | Notification Subframe Index |

| Frame Type | Bit 1 | Bit 2 | Bit 3 | Bit 4 | Bit 5 | Bit 6 |
| --- | --- | --- | --- | --- | --- | --- |
| FDD | SF 1 | SF 2 | SF 3 | SF 6 | SF 7 | SF 8 |
| TDD | SF 3 | SF 4 | SF 7 | SF 8 | SF 9 | N/A |

FIG. 5C

MBSFN-AWARE ADAPTIVE CHANNEL ESTIMATION

CROSS-REFERENCE TO RELATED APPLICATIONS

This application claims the benefit of U.S. Provisional Patent Application No. 61/771,029, filed Feb. 28, 2013, and entitled "MBSFN-AWARE ADAPTIVE CHANNEL ESTIMATION," which is incorporated by reference herein in its entirety for all purposes.

FIELD

The described embodiments relate generally to wireless communications and more particularly to techniques for channel estimation in wireless networks that support a Multimedia Broadcast Multicast Service (MBMS).

BACKGROUND

An MBMS (or an enhanced MBMS, i.e., E-MBMS) can be provided by a wireless network using an MBMS Single Frequency Network (MBSFN) transmission mode defined by a $3^{rd}$ Generation Protocol Project (3GPP) Long Term Evolution (LTE) specification. The MBMS can deliver multimedia content such as text, pictures, audio, and video to multiple wireless communication devices through a broadcast or multicast arrangement using one or more serving nodes of a wireless network. The MBMS provides transport features for sending the same content to all users (broadcast) in a cell or to a given set of users in a cell (multicast). The MBMS differs from an Internet Protocol (IP)-level broadcast and multicast service in that the MBMS shares resources at a radio access level, i.e., within a radio access network portion of the wireless network, while an IP-level broadcast and multicast need not share the radio resources, i.e., each user can receive the content using individually assigned radio resources. In this regard, an MBSFN transmission exploits the orthogonal frequency-division multiplexing (OFDM) radio interface and the LTE frame structure to subdivide transmissions into frames that carry MBMS data and other frames that do not. A control message, e.g., a system information block (SIB) message, can specify in which frames the MBMS data can be transmitted. A specific set of subframes of the frames that support MBMS data can be configured to be MBSFN subframes. The set of frames that transport MBMS data can be configured with a periodicity (how often in number of frames that they repeat), an offset (a frame position at which they start), a number of consecutive frames that carry MBMS data, and a subframe pattern of MBSFN subframes (and non-MBSFN subframes) within the consecutive frames that contain MBMS data. A serving node, e.g., an evolved Node B (eNB) of the wireless network can broadcast periodically in system information blocks (SIBs) information by which the wireless communication device can determine the MBSFN frame and MBSFN subframe patterns.

Channel estimation can be impacted by the presence of MBSFN frames and subframes, particularly in situations in which the MBMS pattern is not known and in "High-Doppler" scenarios when a wireless communication channel's characteristics can rapidly change as a wireless communication device moves within cells of the wireless network. In this regard, the wireless communication channel between the wireless communication device and the cells of the wireless network can vary dramatically within a short time window in a high-Doppler scenario. As such, the wireless communication device can need a greater number of cell specific reference signals (also referred to as pilot signals) in high-Doppler scenarios to be able to closely track the wireless communication channel's variation. When the wireless communication device is aware that certain frames include MBMS data, e.g., based on broadcast system information block (SIB) messages, a channel estimation process in the wireless communication device can be modified to account for which frames/subframes include MBMS data. Before the wireless communication device has received the MBSFN configuration of MBSFN frames and subframes from the broadcast system information blocks, the wireless communication device can benefit from an adaptive channel estimation process that determines potential MBSFN frames and/or subframes and adjusts channel estimation accordingly.

SUMMARY

Apparatus and methods for adapting channel estimation in a Multimedia Broadcast Multicast Service (MBMS) Single Frequency Network (MBSFN) are disclosed. A representative method includes a wireless communication device receiving multiple frames, each frame including multiple subframes, each subframe including multiple symbols. The wireless communication device determines whether or not subframes include MBMS data. For subframes that include MBMS data, the wireless communication device excludes all symbols or certain symbols of the subframes that include MBMS data from a channel estimation process. In some embodiments, the wireless communication device includes at least one symbol from a control region of subframes that include MBMS data in the channel estimation process. The wireless communication device determines whether subframes include MBMS data based at least in part on a channel impulse response and/or a channel energy response for one or more symbols of the subframes. In some embodiments, the wireless communication device maintains a table indicating whether frames and/or subframes include MBMS data and determines an MBSFN pattern from the table. The wireless communication device initializes the table to indicate that all frames and/or subframes do not include MBMS data and updates the table based on determining whether received subframes and/or frames include MBMS data, e.g., using channel impulse responses and/or channel energy responses for symbols of the received subframes.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2A illustrates a frequency division duplex (FDD) frame format for downlink (DL) transmission of an LTE wireless network in accordance with some embodiments.

FIG. 2C illustrates a table of subframe formats for a TDD frame used for DL/UL transmission in an LTE wireless network in accordance with some embodiments.

FIG. 4C illustrates a table of OFDM symbols assignments for different subframe formats in an LTE wireless network in accordance with some embodiments.

FIG. 4D illustrates a table of fields for an information element of a system information block (SIB) that defines MBSFN subframe allocation in accordance with some embodiments.

FIGS. 5A-5C illustrate tables for system information blocks (SIBs) that specify MBSFN frame and/or subframe formats in an LTE wireless network in accordance with some embodiments.

DETAILED DESCRIPTION OF SELECTED EMBODIMENTS

Figure 1:
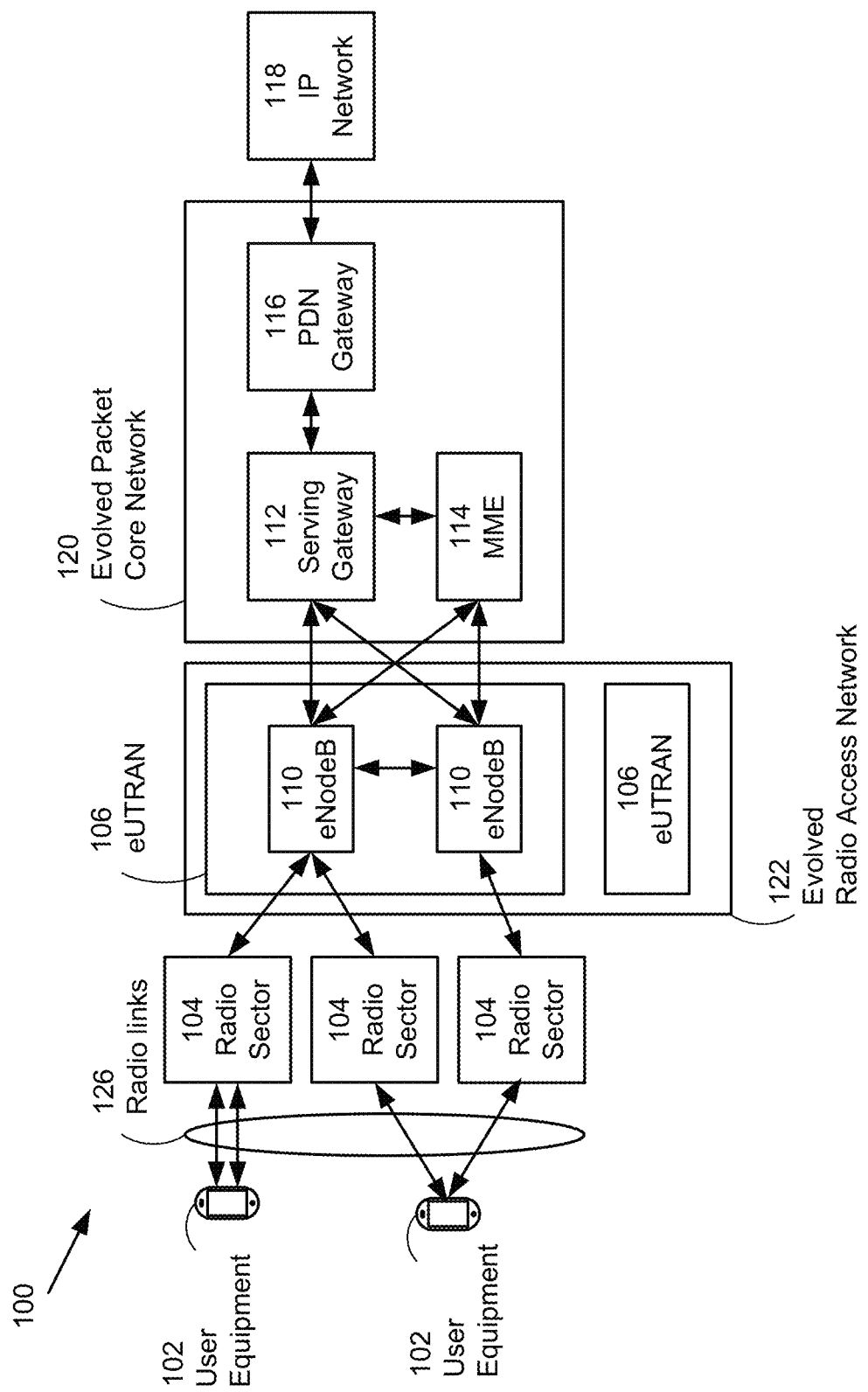
FIG. 1 illustrates a Long Term Evolution (LTE) wireless communication system in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

In accordance with various embodiments described herein, the terms "wireless communication device," "wireless device," "mobile device," "mobile station," and "user equipment" (UE) may be used interchangeably herein to describe one, or any number of, common consumer electronic device(s) that may be capable of performing procedures associated various embodiments the disclosure. In accordance with various implementations, any one of these consumer electronic devices may relate to: a cellular phone or a smart phone, a tablet computer, a laptop computer or a netbook computer, a media player device, an electronic book device, a MiFi® device, as well as any other type of electronic computing device having fourth generation (4G) LTE and LTE Advanced (LTE-A) communication capabilities. In various embodiments, these capabilities may allow a respective UE to communicate within various 4G network cells that can employ any type of LTE-based radio access technology (RAT).

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE or LTE-A networks offering faster data rate throughput, as compared to other 3G legacy networks offering lower data rate throughputs. For instance, in some implementations, a 4G compliant UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The UE can include wireless circuitry that can be configured to cause the UE to transmit and receive signals with a wireless network in accordance with one or more wireless communication protocols. The wireless circuitry of the UE can include transmitters and receivers to provide signal processing of radio frequency wireless signals formatted according to wireless communication protocols, e.g., according to one or more LTE/LTE-A wireless communication protocol. In some embodiments, the wireless circuitry can include components such as: processors and/or specific-purpose digital signal processing (DSP) circuitry for implementing functionality such as, but not limited to, baseband signal processing, physical layer processing, data link layer processing, and/or other functionality; one or more digital to analog converters (DACs) for converting digital data to analog signals; one or more analog to digital converters (ADCs) for converting analog signals to digital data; radio frequency (RF) circuitry (e.g., one or more amplifiers, mixers, filters, phase lock loops (PLLs), and/or oscillators); and/or other components. The wireless circuitry can be referred to, in some embodiments, as a radio and can include one or more components as described hereinabove.

Multimedia Broadcast Multicast Service (MBMS) Single Frequency Networks (MBSFNs) can deliver multimedia broadcast and/or multicast services to multiple wireless communication devices (or a specific targeted subset of wireless communication devices) using a frame format specified in LTE and/or LTE-Advanced wireless communication protocols. Transmissions by the MBSFN can dedicate certain frames to include MBMS data and other frames reserved for non-MBMS data. The frame pattern for MBSFN transmissions can be specified in system information block (SIB) messages broadcast by the wireless network. In advance of receiving and/or decoding the SIB messages that specify an MBSFN pattern of frames, subframes, and/or symbols in subframes that include MBMS data, the wireless communication device can adapt channel estimation processes to include and/or exclude specific symbols from subframes based on a determination of whether the subframe includes or does not include MBMS data. The wireless communication device can maintain a table including information about frames and/or subframes and determine an MBSFN pattern based on information in the table. The wireless communication device can determine whether a subframe includes MBMS data based on channel impulse responses and/or channel energy responses calculated for one or more symbols of the subframe. In some embodiments, a subframe can include at least one "reference" symbol in a known position of the subframe that includes cell specific reference signals. The wireless communication device can use the at least one "reference" symbols to adapt the channel estimation process. The wireless communication device can determine a channel impulse response and/or a channel energy response using the at least one "reference" symbol and compare the determined channel impulse response and/or channel energy response for the "reference" symbol to channel impulse responses and/or channel energy responses calculated for one or more other symbols in the subframe. When the channel impulse responses of the at least one "reference" symbol matches the channel impulse response of the one or more other symbols, the subframe can be determined to not include MBMS data. When the channel impulse response of at least one of the one or more other symbols does not match the at least one "reference" symbol's channel impulse response, the wireless communication device can determine that the subframe includes MBMS data. Similarly, the wireless communication device can compare channel energy responses for different symbols in the subframe to determine whether the subframe includes MBMS data. In some embodiments, the channel impulse responses are compared using auto-correlations and/or cross-correlations of the channel impulse responses with each other. In some embodiments, a total or average energy level for a symbol, e.g., based on a channel energy response calculated for the symbol, can be compared to a "reference" total or average energy level, e.g., based on a channel energy response for a symbol known to contain cell specific reference signals. When the energy levels differ by more than a threshold value, the wireless communication device can determine that the subframe includes MBMS data. Channel estimation processes can be adapted based on a determination of which subframes include or do not include MBMS data. In some embodiments, only certain symbols (or no symbols at all) from subframes that include MBMS data are used in the channel estimation process, e.g. restricted to using symbols from non-MBSFN regions of MBSFN subframes and/or symbols from non-MBSFN subframes to update channel estimates.

FIG. 1 illustrates a diagram 100 of a representative Long Term Evolution (LTE) wireless network that can include user equipment (UE) 102 connected by one or more radio links 126 to one or more radio sectors 104 provided by an evolved radio access network 122. Each radio sector 104 can represent a geographic area of radio coverage emanating from an associated evolved Node B (eNodeB) 110 using a radio frequency channel operating at a selected frequency. In some embodiments, radio sectors 104 can also be referred to as cells or radio cells. Each eNodeB 110 can generate one or more radio sectors 104 to which the UE 102 can connect by one or more radio links 126. In some wireless networks 100, the UE 102 can be connected to more than one radio sector 104 simultaneously. The multiple radio sectors 104 to which the UE 102 can be connected can emanate from a single eNodeB 110 or from separate eNodeB's 110. A group of eNodeBs 110 can be referred to as an evolved Universal Mobile Telecommunications System (UMTS) radio access network (eUTRAN) 106. Typically each eNodeB 110 in an eUTRAN 106 can include a set of radio frequency transmitting and receiving equipment mounted on an antenna tower and a radio controller for controlling and processing transmitted and received radio frequency signals. The eNodeB 110 of the eUTRAN 106 can manage the establishment, maintenance and release of the radio links 126 that connect the UE 102 to an evolved radio access network 122. In some embodiments, the eNodeB 110 can provide access to a wireless network based on an LTE technology, such as an LTE wireless network and/or LTE-Advanced (LTE-A) wireless network. It will be appreciated, however, that various example embodiments are not limited to application in LTE wireless network systems. In this regard, embodiments and techniques described herein can be applied to any wireless networking technology, present or future, in which channel estimation can be performed in the presence of MBSFN and/or other similar multicast/broadcast technology that can utilize shared radio resources. The UE 102 can be configured to perform MBSFN-aware adaptive channel estimation on transmissions that can be emitted by the eNodeB 110.

Radio resources that form the radio links 126 in the radio sectors 104 can be shared among multiple UEs 102 using a number of different multiplexing techniques, including time division, frequency division, code division, space division and combinations thereof. A radio resource control (RRC) signaling connection can be used to communicate between the UE 102 and the eNodeB 110 in the eUTRAN 106 of the evolved radio access network 122 including requests for and dynamic allocations of radio resources to multiple UEs 102.

The UE 102 can be connected to the evolved radio access network 128 through one or more radio sectors 104 simultaneously.

The evolved radio access network 122, which provides radio frequency air link connections to the UE 102, connects also to an evolved packet core network 120. The LTE wireless network 100 can be designed to operate as a packet switched network exclusively. The evolved packet core network 120 can include serving gateways 112 that interconnect the evolved radio access network 122 to public data network (PDN) gateways 116 that connect to external internet protocol (IP) networks 118. The eNodeB's 110 can also be connected to a mobility management entity (MME) 114 that can provide control over connections for the user equipment 102. The eNodeB 110 can control allocation of radio resources for the radio links 126 to the user equipment 102. The eNodeB 110 can communicate paging messages to the user equipment 102, including paging messages to establish an RRC connection with the user equipment 102 and transition from an RRC idle state to an RRC connected state. The eNodeB 110 can schedule radio resources for the UE 102 and provide indications of radio resource allocations using signaling messages communicated in a physical downlink control channel (PDCCH). The UE 102 can monitor the PDCCH to determine when radio resources are assigned to the particular UE 102 for downlink transmission from the eNodeB 110 or for uplink transmission to the eNodeB 110. The eNodeB 110 can also broadcast system information block (SIB) messages periodically to inform the UE 102 about properties of the radio sectors 104 and/or for services provided by the eNodeB 110. In some embodiments, the SIB messages include information about a multimedia broadcast multicast service (MBMS) provided by the eNodeB 110, e.g., including specific frames, subframes, and/or symbols of subframes that can include MBSFN regions.

FIG. 2A illustrates a diagram 200 of an LTE frame structure for a frequency division multiplex (FDD) frame 202A, which can also be referred to as an LTE Type 1 frame, for downlink transmission from the eNodeB 110 to the UE 102. Each LTE Type 1 FDD frame 202A can span a time period of ten milliseconds (10 ms) and be subdivided into ten consecutive subframes 204A (numbered from 0 to 9) spanning 1 ms each. A subframe 204A can be further divided into two time slots, each time slot spanning 0.5 ms. Radio frames transmitted by the eNodeB 110 to the UE 102 can be numbered using a system frame number (SFN), which can be defined using a 10 bit string that provides for values from 0 to 1023. The eight most significant bits of the SFN can be broadcast by the eNodeB 110 in master information block (MIB) messages to the UE 102. Transmissions by the eNodeB 110 can be formatted using orthogonal frequency division multiplexing (OFDM) symbols padded with a cyclic prefix. For a normal length cyclic prefix, each time slot of a subframe 204A can include seven OFDM symbols, while for an extended length cyclic prefix, each time slot of a subframe 204A can include six OFDM symbols (the extended cyclic prefix using more time samples than the normal cyclic prefix and thus reducing the number of OFDM symbols per 1 ms subframe). The OFDM symbols can include information on multiple subcarriers transmitted at different radio frequencies simultaneously. Within each subframe 204A, a number of OFDM symbols can include control information (indicated in FIG. 2A as control symbols 206), which can carry control information such as the PDCCH to indicate a set of radio frequency resource elements assigned to the UE 102. The number of OFDM symbols per subframe 204A used for control information can vary. The remaining OFDM symbols of a subframe 204A can carry payload (data), e.g., using a physical downlink shared channel (PDSCH), and can be designated as payload symbols 208 as shown in FIG. 2A.

Figure 2B:
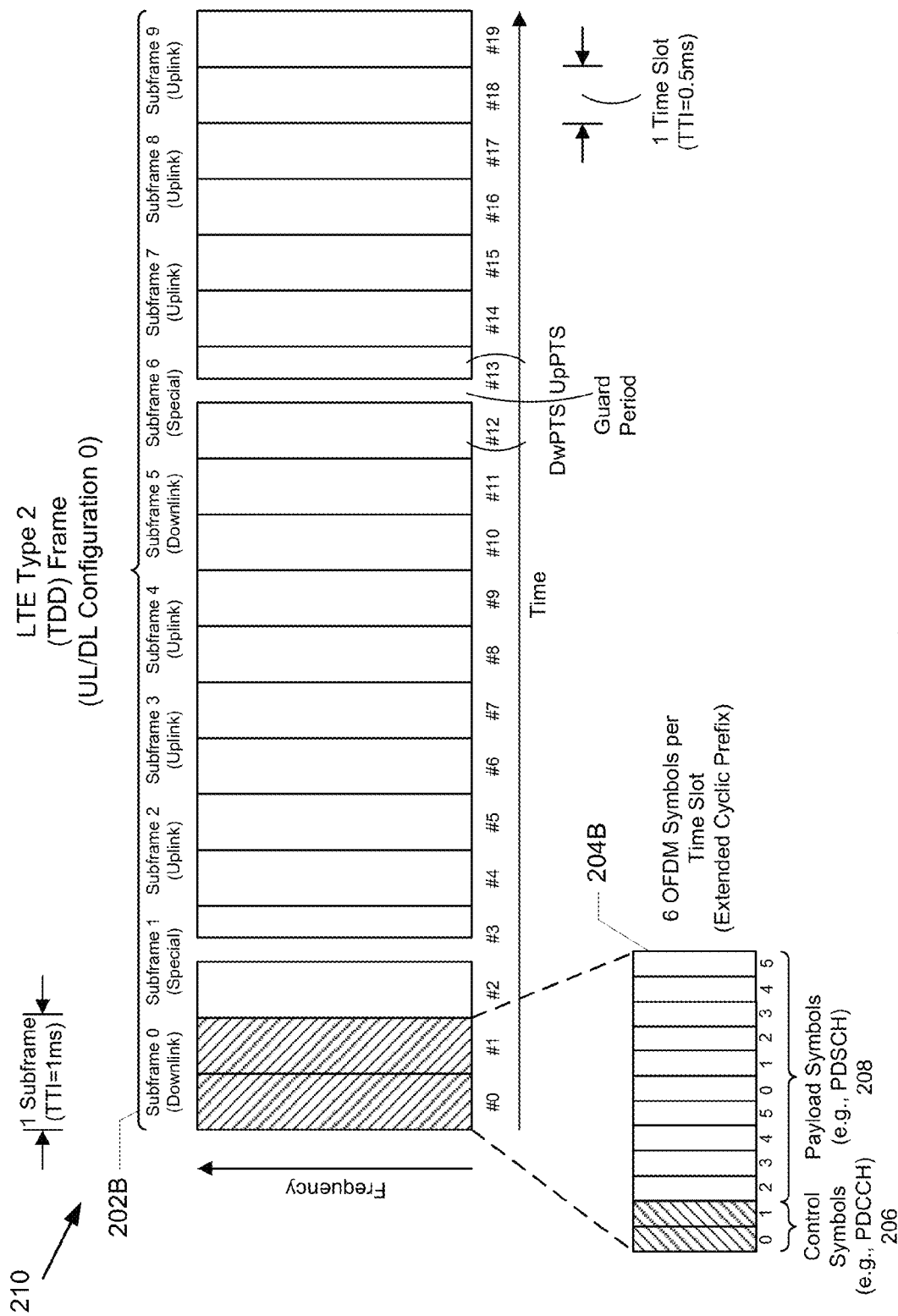
FIG. 2B illustrates a time division duplex (TDD) frame format for DL and uplink (UL) transmission of an LTE wireless network in accordance with some embodiments.

FIG. 2B illustrates a diagram 210 of an LTE frame structure for a time division multiplex (TDD) frame 202B, which can also be referred to as an LTE Type 2 frame, for downlink and uplink transmissions between the eNodeB 110 and the UE 102. Each LTE Type 2 TDD frame 202B can span a time period of ten milliseconds (10 ms) and be subdivided into ten consecutive subframes 204B (numbered from 0 to 9) spanning 1 ms each. Subframes 204B can be designated as downlink (DL) subframes for transmission from the eNodeB 110 to the UE 102, uplink (UL) subframes for transmission from the UE 102 to the eNodeB 110, or special subframes, which can include a downlink portion, a guard period, and an uplink portion. The downlink portion of a special subframe can be referred to as a downlink pilot time slot (DwPTS), while the uplink portion of a special subframe can be referred to as an uplink pilot time slot (UpPTS). Special subframes can be used for TDD communication when transitioning from downlink to uplink transmission, but are not used when transitioning from uplink to downlink transmission. Downlink and uplink subframes 204B can be divided into two time slots, each time slot spanning 0.5 ms, while special subframes can be divided into three time periods. Downlink subframes 204B can include multiple OFDM symbols, which can include control symbols and payload symbols, as described herein also for FDD subframes 204A. The configuration of an LTE Type 2 TDD frame 202B can be specified in information broadcast in a system information block (SIB) message. The number of downlink subframes, special subframes, and uplink subframes can vary based on different configurations.

FIG. 2C illustrates a table 220 of TDD uplink/downlink (UL/DL) configurations for TDD frames 202B in an LTE wireless network. Each UL/DL configuration specifies subframes that are used as downlink subframes, uplink subframes, or special subframes. Downlink subframes within a TDD frame 202B are not always consecutive, which can prove challenging for channel estimation algorithms when "high Doppler" mobility of the UE 102 produces rapidly changing channel characteristics. Depending on the amount of Doppler shift, the communication channel can change for two non-consecutive DL subframes of a TDD frame 202B. As summarized in table 220, subframes #0 and #5 are always designated as DL subframes, which can include OFDM symbols with reference signals transmitted in specific resource elements. The reference signals can be used in estimating characteristics of the communication channel between the eNodeB 110 and the UE 102. The special subframes can also include a number of downlink OFDM symbols with reference signals embedded. As shown in table 220 of FIG. 2C, for TDD systems, DL subframes may not be consecutive within a frame, depending on the UL/DL configuration. Long time gaps between DL subframes can prove challenging for the channel estimation process.

Figure 2D:
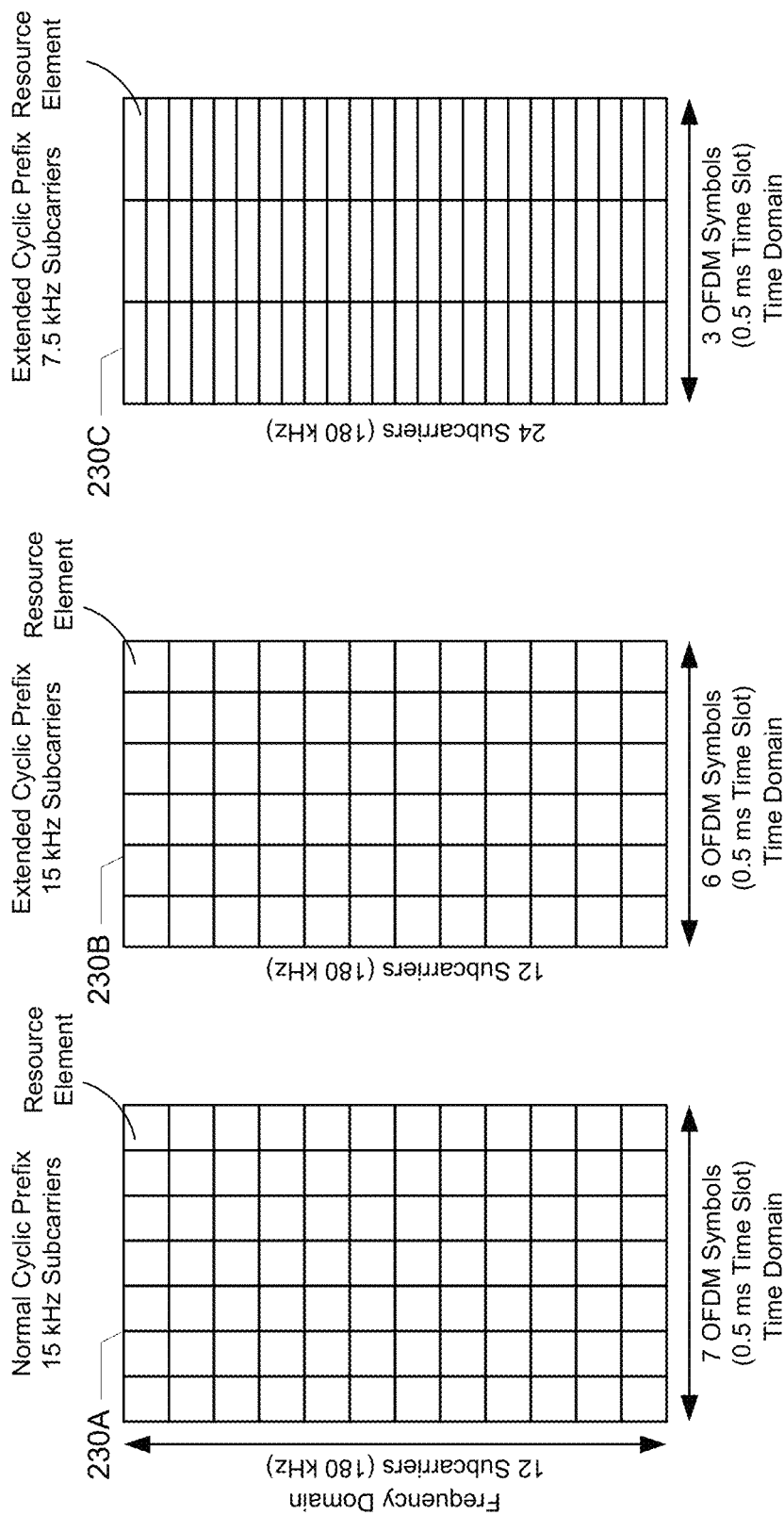
FIG. 2D illustrates a set of resource block formats for communication in an LTE wireless network in accordance with some embodiments.

FIG. 2D illustrates a set of resource blocks 230A/B/C under different configurations for an LTE wireless network using either normal length cyclic prefixes or extended length cyclic prefixes, with either 15 kHz spacing between subcarriers or 7.5 kHz spacing between subcarriers. Each 0.5 ms time slot of a subframe can include multiple resource blocks 230 A, B, or C, each resource block spanning approximately 180 kHz in the frequency domain, which provides for 12 subcarriers with 15 kHz spacing or 24 subcarriers with 7.5 kHz spacing. A resource block 230 A/B/C can represent a basic unit of radio frequency resources for an LTE radio air interface between the UE 102 and the eNodeB 110. The eNodeB 110 can allocate resource blocks 230 A/B/C to a UE 102 for data transfer (in the downlink and/or uplink directions). Each resource block can include multiple resource elements, with each resource element belonging to a particular OFDM symbol and a particular subcarrier combination. Some resource elements are used for the transport of data, while other resource elements are used for control signaling, e.g., to transport reference signals by which to estimate the communication channel between the eNodeB 110 and the UE 102. The 3GPP LTE wireless communication protocols specify a number of antenna ports that can be used in parallel for downlink transmission. The 3GPP Release 8 wireless communication protocol specifies antenna ports 0 to 3 to support downlink transmission, including single stream, transmit diversity, and multiple input multiple output (MIMO) transmission applications. Transmissions via antenna ports 0 to 3 can include cell specific reference signals that can be used for channel estimation. The 3GPP Release 8 wireless communication protocol also specifies an antenna port 4 to support Multimedia Broadcast Multicast Services (MBMS). Transmissions via an antenna port 4 can include MBSFN reference signals.

Figure 3A:
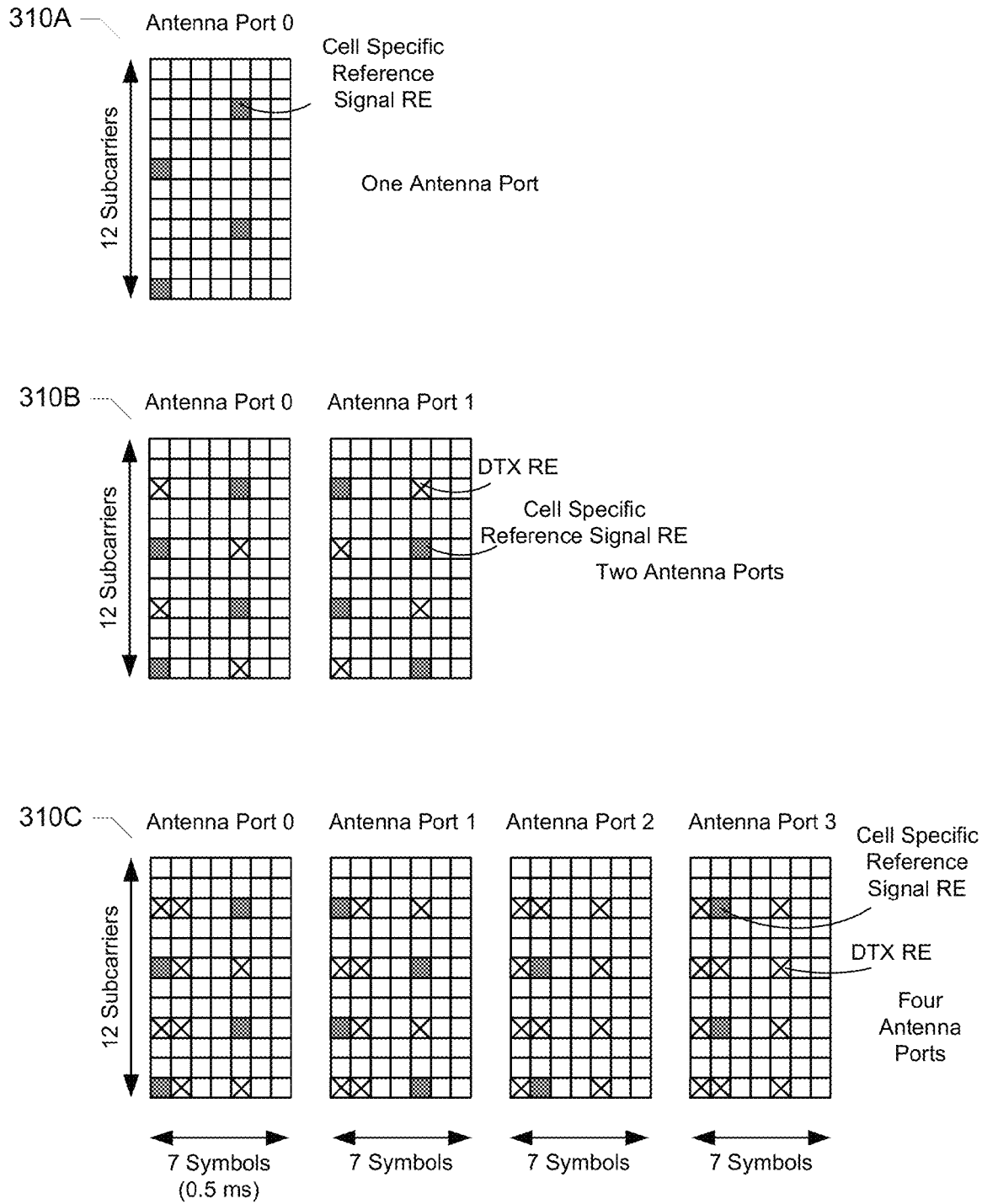
FIG. 3A illustrates a set of resource element assignments for cell specific reference signals used with normal cyclic prefix transmissions in non-MBSFN subframes in an LTE wireless network in accordance with some embodiments.

FIG. 3A illustrates diagrams of resource blocks 310A/B/C for downlink transmissions using a normal cyclic prefix configuration over one, two, and four antenna ports for subframes in non-MBSFN frames. Each column in a resource block represents an OFDM symbol for a particular time period, while each row in a resource block represents a subcarrier at a particular frequency. Cell specific reference signals can be broadcast by the eNodeB 110 across a radio sector 104 (i.e., throughout a cell) to provide known signals with which the UE 102 can measure communication channel quality characteristics, e.g., reference signal received power (RSRP) and reference signal received quality (RSRQ), which can be reported in channel quality indication (CQI) messages from the UE 102 to the eNodeB 110. The cell specific reference signals can also be used to estimate communication channel characteristics to adapt processing of received signals to account for channel variation, e.g., due to mobility of the UE 102 or to other changing channel conditions. Resource elements to carry the cell specific reference signals are spaced apart in both time (i.e., on different OFDM symbols of a time slot of a subframe) and frequency (i.e., on different subcarriers). The UE 102 can use the received cell specific reference signals to determine channel characteristics in both time and frequency, including interpolating between successive OFDM symbols that include the cell specific reference signals and between non-adjacent subcarriers that carry the cell specific reference signals. A mapping of cell specific reference signals onto resource elements as indicated in FIG. 3A for different antenna ports can apply for both LTE Type 1 (FDD) frames 202A and LTE Type 2 (TDD) frames 202B. When multiple antenna ports are used for parallel transmission, different resource elements are allocated for each antenna port, as shown by the resource blocks 310B (for two antenna ports) and 310C (for four antenna ports) in FIG. 3A. When a resource element is allocated as a reference signal RE for one antenna port, the corresponding REs for the other antenna ports are not used for transmission (i.e., discontinuous transmit or DTX is used) to prevent interference between the parallel transmissions for the reference signals and thereby provide for improved reception of the cell specific reference signals by the UE 102.

Figure 3B:
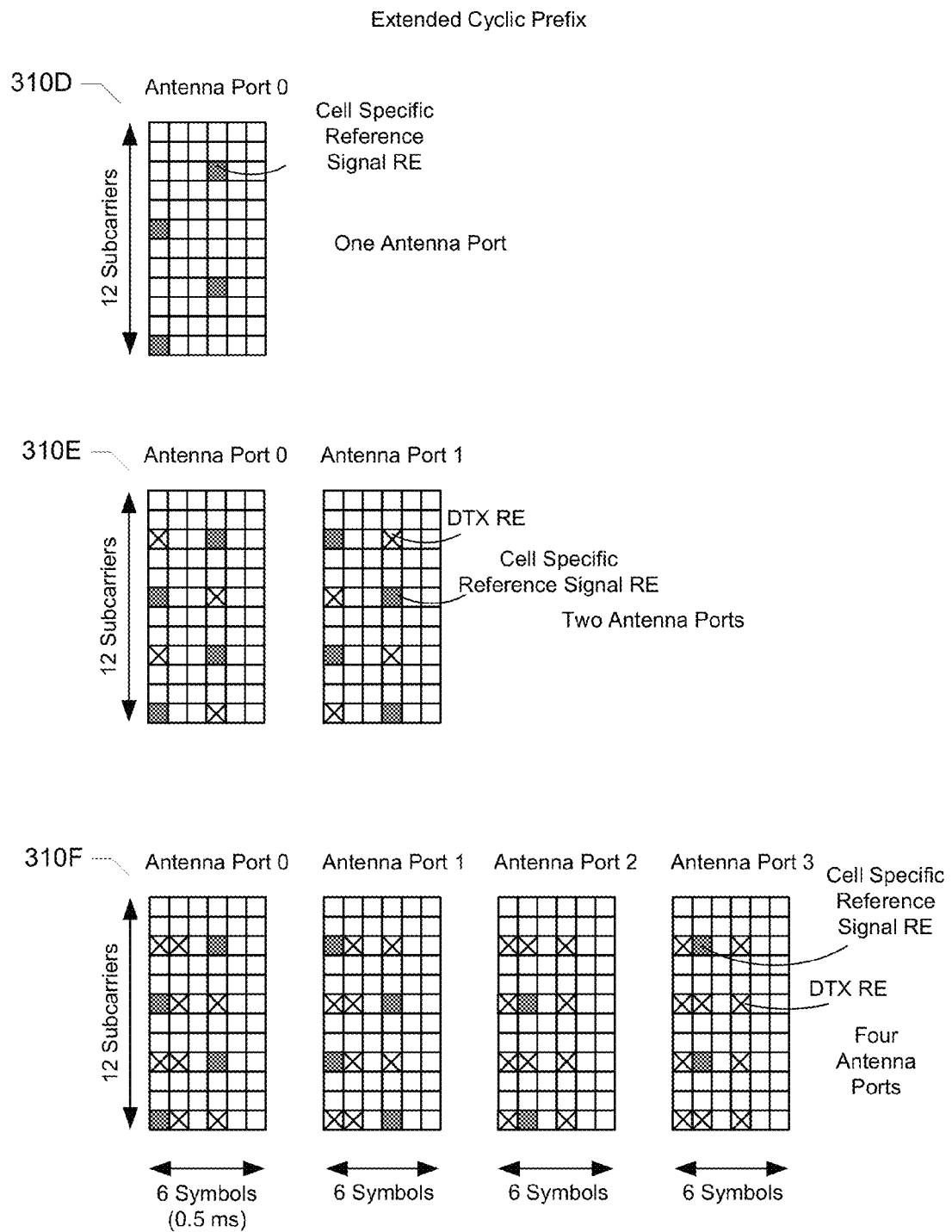
FIG. 3B illustrates a set of resource element assignments for cell specific reference signals used with extended cyclic prefix transmissions in non-MBSFN subframes in an LTE wireless network in accordance with some embodiments.

FIG. 3B illustrates resource blocks 310D/E/F for one, two, and four antenna port configurations respectively when an extended cyclic prefix is used for a subframe, resulting in fewer OFDM symbols per time slot of the subframe. Reference signals are allocated to resource elements as indicated in FIG. 3B for subframes of non-MBSFN frames that use the extended cyclic prefix configuration.

Figure 3C:
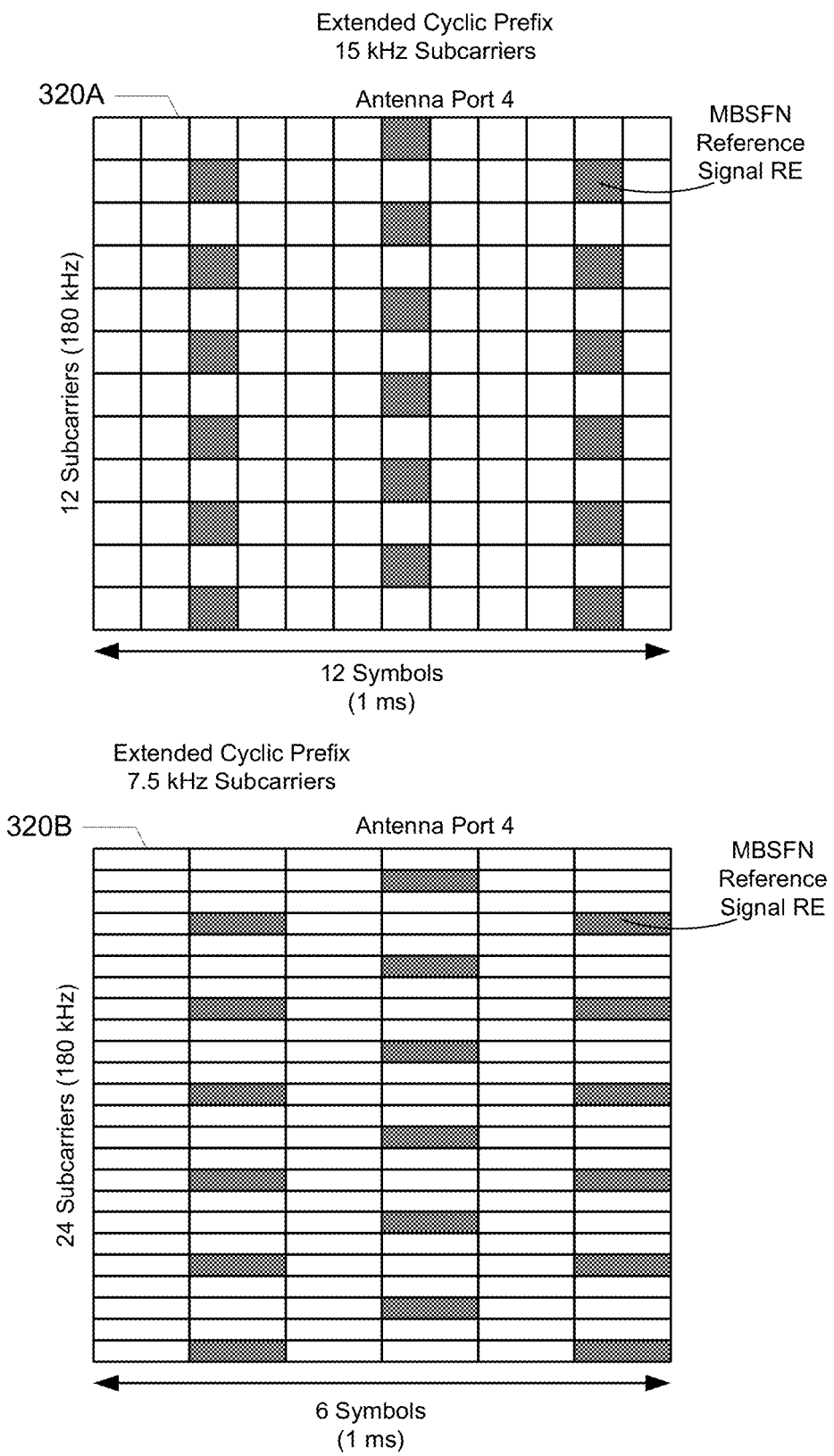
FIG. 3C illustrates a set of resource element assignments for MBSFN reference signals used with extended cyclic prefix transmissions in MBSFN subframes in an LTE wireless network in accordance with some embodiments.

FIG. 3C illustrates resource blocks 320A/B for subframes that support MBSFN transmissions. MBSFN reference signals are allocated to resource elements as indicated in FIG. 3C, which differs from the allocation for cell specific reference signals indicated in FIGS. 3A and 3B. The MBSFN reference signals are used only with subframes that include an extended cyclic prefix, as multiple eNodeB 110 can simultaneously broadcast the MBSFN subframes, which can result in a relatively larger value of delay spread that can require the extended cyclic prefix to compensate. Only a single antenna port configuration (antenna port 4) is defined for MBSFN transmissions. Comparing FIGS. 3B and 3C for a single port configuration with extended cyclic prefix, two time slots of a non-MBSFN subframe can include cell specific reference signals in OFDM symbols #0, #3, #6, and #9, while two time slots of an MBSFN subframe can include MBSFN reference signals in OFDM symbols #2, #6, and #10. When the UE 102 does not know a priori whether a subframe is a non-MBSFN subframe type or an MBSFN subframe type, the UE 102 can be limited to using cell specific reference signals in the control (non-MBSFN) region of the subframe, e.g., in OFDM symbol #0 in a single antenna port or dual antenna port configuration or in OFDM symbols #0 and #1 in a four antenna port configuration, as the remaining OFDM symbols in the MBSFN region of the MBSFN subframe can include MBSFN data or MBSFN reference signals rather than cell specific reference signals.

Figure 3D:
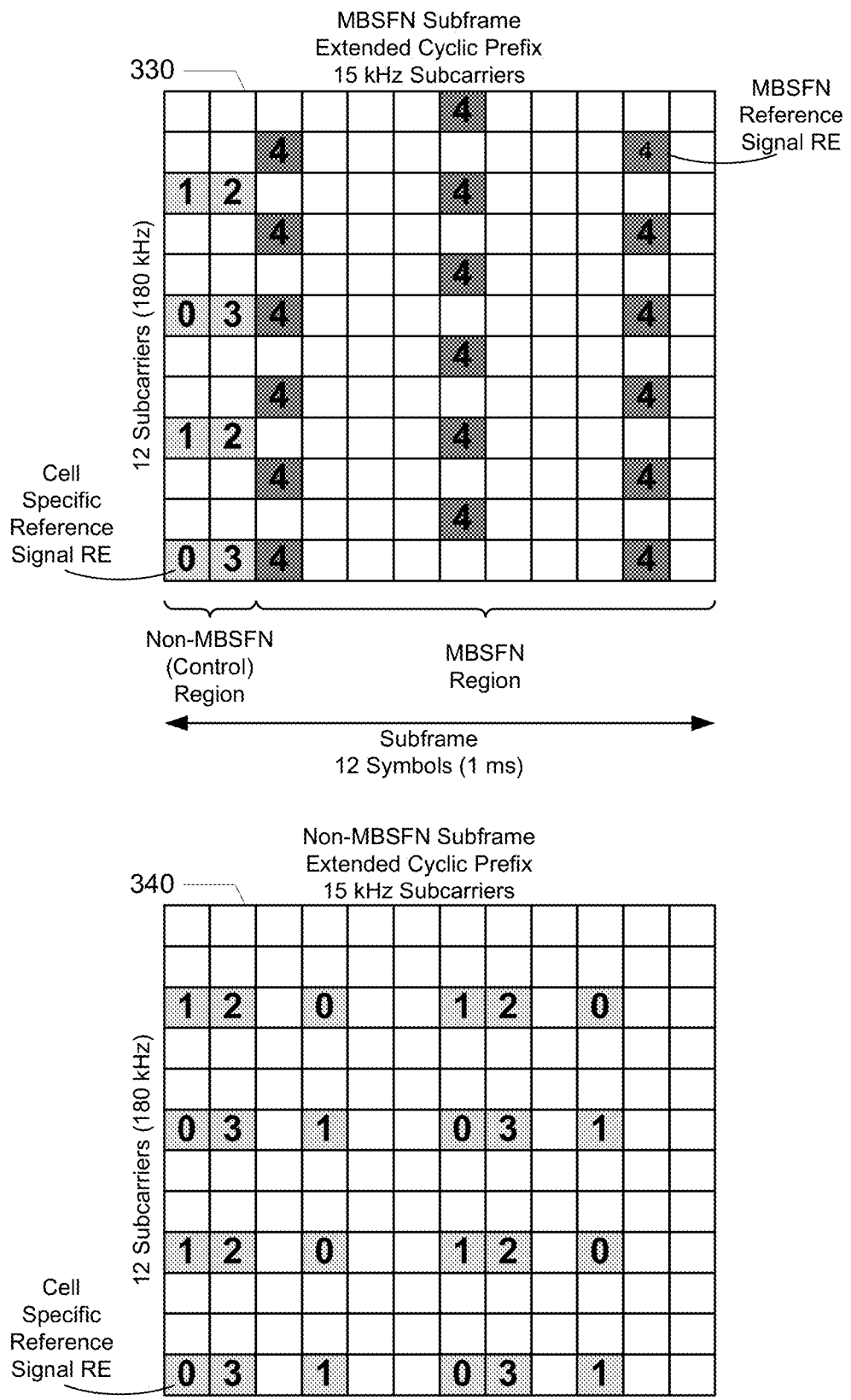
FIG. 3D illustrates resource element assignments for cell specific reference signals and MBSFN reference signals used with extended prefix transmission in an MBSFN subframe and in a non-MBSFN subframe in an LTE wireless network in accordance with some embodiments.

FIG. 3D illustrates a resource block for a representative MBSFN subframe 330 with extended cyclic prefix and a representative non-MBSFN subframe 340 with extended cyclic prefix. The MBSFN subframe 330 includes a non-MBSFN control region spanning two OFDM symbols and an MBSFN region spanning ten OFDM symbols. Each subframe that is configured for MBSFN transmission includes both an MBSFN region and a non-MBSFN region. In LTE wireless networks, a subset of downlink subframes in a radio frame on a carrier that supports physical downlink shared channel (PDSCH) transmission can be configured as an MBSFN subframe by higher layers, and each configured MBSFN subframe can be divided into MBSFN regions and non-MBSFN regions, e.g., as illustrated by resource block 330 of FIG. 3D. In an LTE wireless network, the non-MBSFN region of an MBSFN subframe can span the first one or two OFDM symbols in the MBSFN subframe. (Only a two OFDM symbol non-MBSFN region is illustrated in FIG. 3D; however, a resource block that includes only one OFDM symbol for the non-MBSFN region can also be considered for the channel estimation adaptation embodiments described herein.) The number of OFDM symbols allocated for a physical downlink control channel (PDCCH) can be defined in accordance with Table 410 shown in FIG. 4C. The length of a control region (non-MBSFN region) for an MBSFN subframe can span one or two OFDM symbols as specified in Table 410. The MBSFN region in an MBSFN subframe can be defined in an LTE wireless network as the remaining OFDM symbols not used for the control (non-MBSFN) region of the MBSFN subframe. The number of PDCCHs defined for MBSFN subframes in an LTE system can differ from the number of PDCCHs defined for "regular" non-MBSFN downlink subframes, as detailed in Table 410 of FIG. 4C. An OFDM symbol in the Non-MBSFN (control) region of the MBSFN subframe 330 can include cell specific reference signals allocated to reference elements. The numbers indicated in the cell specific reference elements of the MBSFN subframe 330 can refer to the antenna port(s) on which the cell specific reference signals or the MBSFN reference signals can be transmitted, e.g., as described for FIG. 3B. All possible cell-specific reference signal resource elements for up to four antenna ports in the non-MBSFN (control) region of the MBSFN subframe 330 are indicated. The MBSFN reference signal resource elements in the MBSFN region of the MBSFN subframe 330 are transmitted on antenna port 4 as indicated. For completeness, FIG. 3D also illustrates a non-MBSFN subframe 340 with cell specific reference signals transmitted via multiple antenna ports on multiple symbols of the non-MBSFN subframe 340.

Figure 4A:
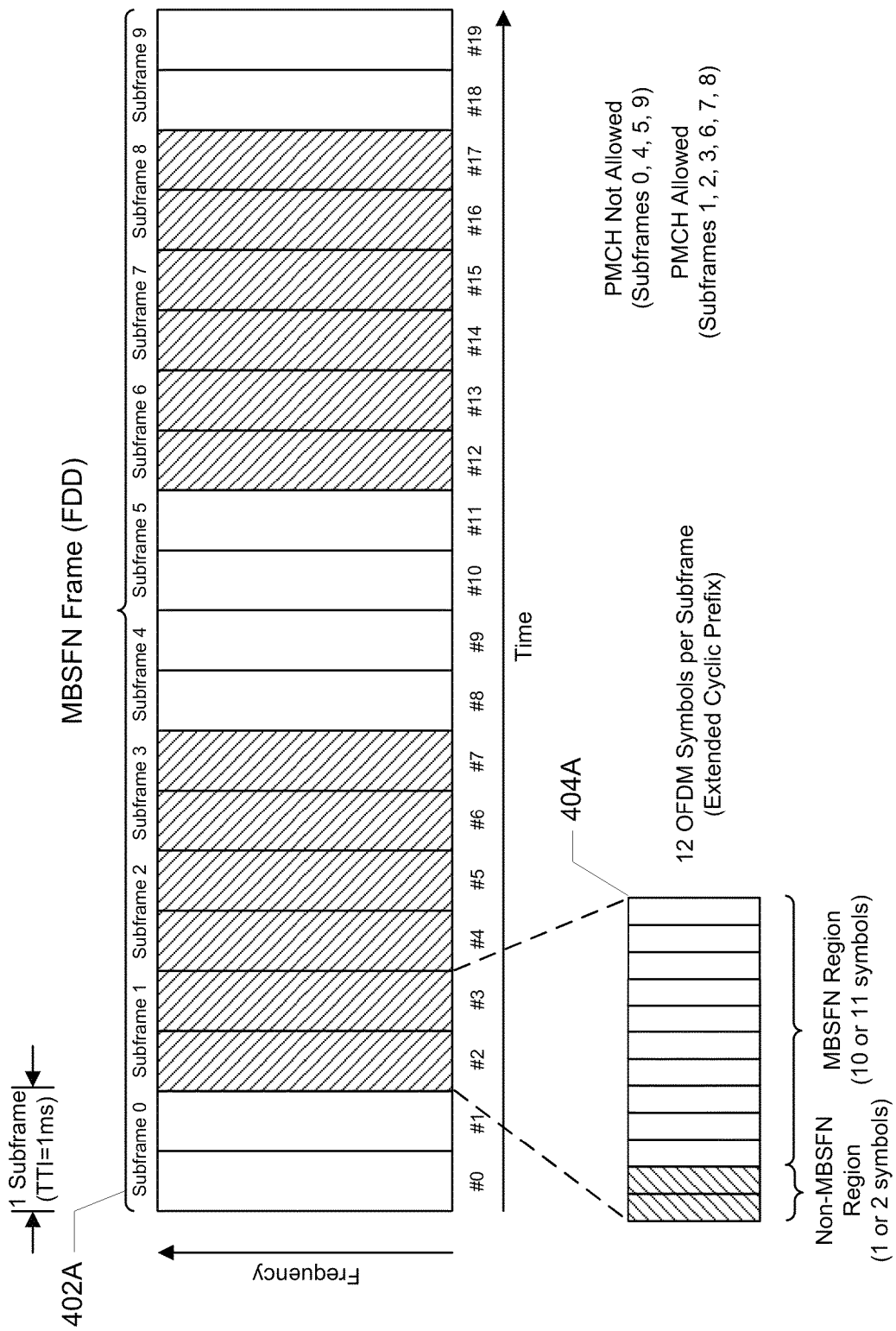
FIG. 4A illustrates a subframe format for an FDD MBSFN frame in an LTE wireless network in accordance with some embodiments.

The LTE wireless network can broadcast information about the configuration of frames and subframes that support MBSFN transmissions. In particular the LTE Release 8 wireless communication protocol includes information elements in system information block 2 (SIB 2) messages for the MBSFN configuration as detailed in Table 500 of FIG. 5A. An MBSFN Subframe Configuration List can define the MBSFN subframes that are reserved for MBMS data in the downlink direction. The SIB 2 message can define the MBSFN subframes by using a radio frame allocation period, a radio frame allocation offset, and a subframe allocation string. For LTE Type 1 (FDD) MBSFN frames, subframes #1, #2, #3, #6, #7, and #8 can be MBSFN subframes as illustrated by the MBSFN (FDD) Frame 402A in FIG. 4A. A physical multimedia channel (PMCH) that is used to transport MBMS data can be allowed for only those subframes indicated, while the remaining subframes #0, #4, #5, and #9 can be reserved as non-MBSFN subframes. As described elsewhere herein, each MBSFN subframe 404A can include a non-MBSFN (control) region, which can span one or two OFDM symbols, and an MBSFN region, which can span the remaining ten or eleven OFDM symbols of the MBSFN subframe 404A as shown in FIG. 4A. For LTE Type 2 (TDD) MBSFN frames, subframes #3, #4, #7, #8, and #9 can be allocated to MBMS data, i.e., allowed to transport the PMCH, while subframes #0, #1, #2, #5, and #6 can be reserved as non-MBSFN subframes as illustrated by MBSFN (TDD) Frame 402B of FIG. 4B. Additional information that defines an MBSFN Area (geographic coverage) is provided in Release 9 of the 3GPP LTE specification by a SIB 13 message, the information elements of which are summarized in Table 510 of FIG. 5B.

The MBSFN-SubframeConfigList Information Element of the SIB 2 message can be defined based on the following with descriptions for the information element fields provided in Table 420 of FIG. 4D.

```
-- ASN1START
MBSFN-SubframeConfig ::=   SEQUENCE {
    radioframeAllocationPeriod  ENUMERATED {n1, n2, n4, n8, n16, n32},
    radioframeAllocationOffset  INTEGER (0..7),
    subframeAllocation          CHOICE {
        oneFrame      BIT STRING (SIZE(6)),
        fourFrames    BIT STRING (SIZE(24))
    }
}
-- ASN1STOP
```

Radio frames that include MBSFN subframes occur with a periodicity specified by the radioFrameAllocationPeriod field. Radio frames are counted sequentially using a system frame number (SFN) value, and Equation (1) in FIG. 4D indicates for which SFN values MBSFN subframes can occur. The periodicity of frames that include MBSFN subframes can vary from as often as every frame (periodicity=1) to every 32 frames. The radioFrameAllocationOffset indicates the first frame within a periodicity of n frames at which the MBSFN frames begin. Either one MBSFN frame or four consecutive MBSFN frames are allocated for each period of n frames. A pattern of MBSFN subframes in the one MBSFN frame or four MBSFN frames is determined by the six bit string "oneFrame" or the 24 bit string "fourFrames" respectively as detailed in Table 420 of FIG. 4D and in Table 520 of FIG. 5C. Only certain subframes in an MBSFN frame can be allocated to carry MBMS data. In advance of receiving the detailed allocation of MBSFN frames and MBSFN subframes, as specified in the SIB 2 information elements, the UE 102 can assume that subframes #1, #2, #3, #6, #7, and #8 for FDD transmissions and subframes #3, #4, #7, #8, #9 for downlink TDD transmissions can potentially be allocated for MBSFN transmission and thus may contain MBMS data and MBSFN reference signals formatted in accordance with an MBSFN subframe rather than cell specific reference signals formatted in accordance with "normal" transmission.

The reference signal (RS) structure for MBSFN subframes can differ from the RS structure of non-MBSFN subframes as illustrated in FIGS. 3A-3D. In this regard, the reference signals in MBSFN subframes can occupy a different pattern of frequency (subcarrier) and time (OFDM symbol) resource elements than in non-MBSFN subframes. FIG. 3C illustrates a diagram 320A of an example MBSFN RS structure for MBSFN RS transmission with a subcarrier spacing of $\Delta f=15$ kHz. FIG. 3C also illustrates a diagram 320B for a subcarrier spacing of $\Delta f=7.5$ kHz for an MBSFN-dedicated radio sector (cell) 104, in which the MBSFN reference signal can be mapped to different resource elements than used for the wider 15 kHz subcarrier spacing. The resource elements used for reference signal transmission can be associated with specific antenna ports, e.g., antenna port 4 for MBSFN transmission as indicated in FIG. 3C, and antenna ports 0 through 3 for non-MBSFN transmission as indicated in FIGS. 3A-3B. As the MBSFN reference signals differ from the cell specific reference signals, a channel estimation (CE) process that operates using the cell specific reference signals can choose to use only those OFDM symbols known to carry the cell specific reference signals and choose to ignore OFDM symbols that may carry MBSFN reference signals.

When a pattern of MBSFN transmission is known, e.g., as communicated by the SIB 2 information elements, the UE 102 can adjust which OFDM symbols are used for channel estimation, e.g., distinguishing between MBSFN frames and non-MBSFN frames, MBSFN subframes versus non-MBSFN subframes, and MBSFN regions versus non-MBSFN (control) regions of MBSFN subframes. The MBSFN reference signals may not generate meaningful channel estimates for the channel estimation process that is based on the cell specific reference signals. Thus, the CE process needs to be aware of which frames and which subframes include MBSFN reference signals to avoid using OFDM symbols with MBSFN reference signals in the CE process. In some embodiments, the channel estimation process can "freeze" the channel estimation for known MBSFN subframes and/or for subframes that may contain MBMS data, e.g., "potential" MBSFN subframes.

When the periodicity, offset, and/or pattern of MBSFN frames/subframes is not known, e.g., in advance of decoding the SIB 2 messages from the eNodeB 110, the UE 102 can, in some embodiments, assume MBSFN presence at all potential subframe locations and freeze channel estimation for those potential subframes. Excluding all "potential" MBSFN subframes from the channel estimation process, however, can be suboptimal, as a number of OFDM symbols with cell specific reference signals can be unnecessarily excluded, as a potential MBSFN subframe may not be an actual MBSFN subframe. In addition, each actual MBSFN subframe includes a non-MBSFN (control) region, which contains at least one OFDM symbol that includes cell specific reference signals that can be used for channel estimation. The channel estimation process can seek to adapt to changing communication channel characteristics, which can vary rapidly and can require more information (i.e., a higher density of reference signals) than can be provided when excluding all potential MBSFN subframes from the channel estimation process. Thus, as described herein, in some embodiments, the UE 102 can determine "on the fly" whether a particular received subframe is likely to be an MBSFN subframe and adapt the channel estimation process accordingly. In some embodiments, the UE 102 can maintain a table with indications of potential and/or actual MBSFN frames and MBSFN subframes and determine a transmission pattern, e.g., the MBSFN periodicity, MBSFN offset, and/or MBSFN subframe allocation, in advance of decoding SIB 2 information elements. The UE 102 can use the table to assist in selecting which OFDM symbols of which subframes in which frames to include in or exclude from a channel estimation process.

In addition to the channel estimation process, a channel impulse response (CIR) obtained therefrom can be used by a frequency tracking loop (FTL) and/or by a time tracking loop (TTL) in the UE 102. The FTL and TTL processes, during potential or actual MBSFN subframes, can either be updated based on CIRs from non-MBSFN subframes, or the updating of the FTL and/or TTL processes can be frozen during MBSFN subframes. As the traffic pattern of MBSFN subframes can differ from "regular" non-MBSFN subframes, an automatic gain control (AGC) process can be handled separately for MBSFN subframes by the UE 102 in some embodiments.

Figure 4B:
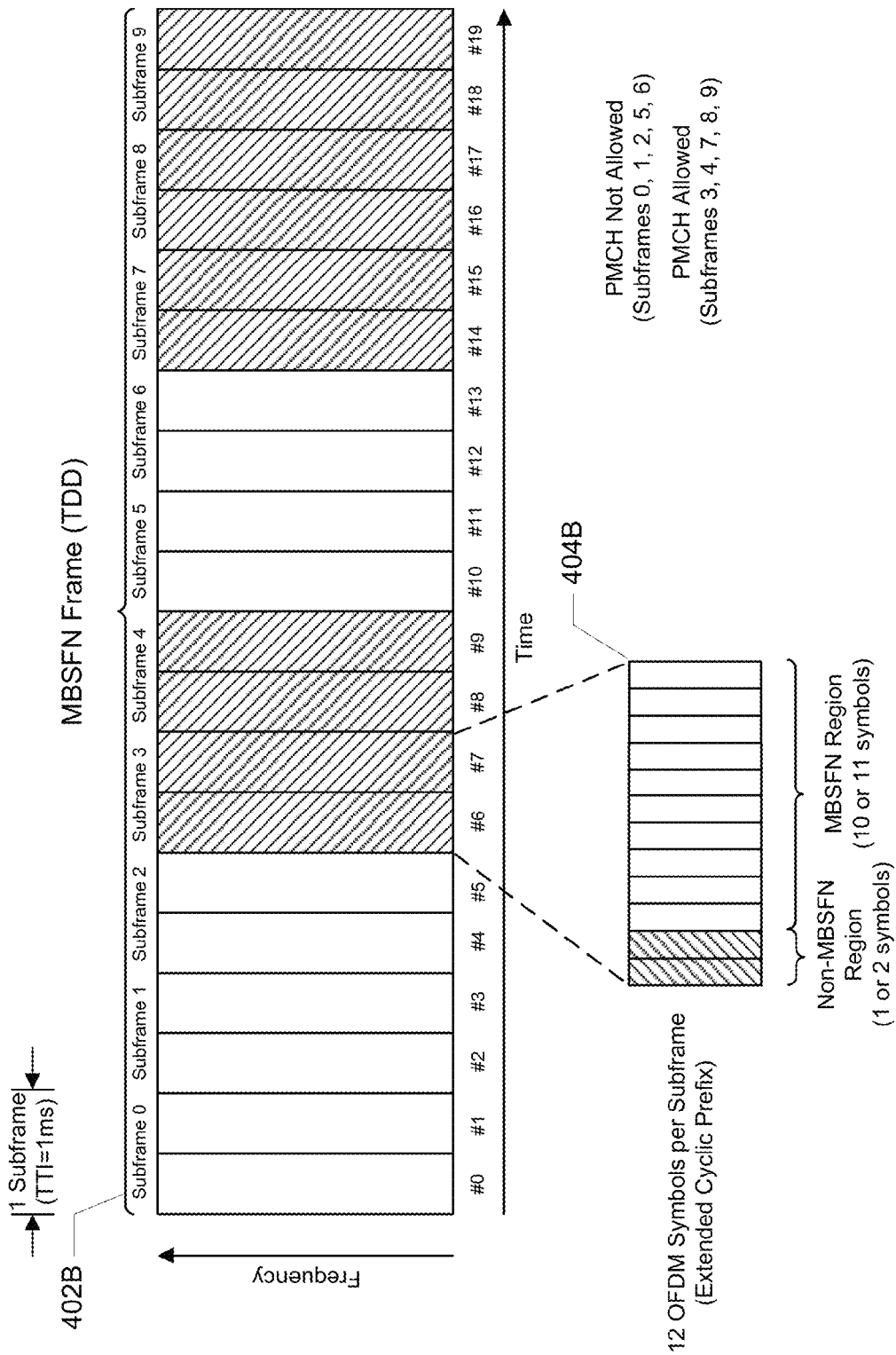
FIG. 4B illustrates a subframe format for a TDD MBSFN frame in an LTE wireless network in accordance with some embodiments.

As previously discussed, channel estimation in high-Doppler scenarios can be problematic when an MBSFN pattern is not known or is not estimated. In Time Division (TD)-LTE, when potential MBSFN subframes are skipped, there can be a limited number of DL subframes remaining for channel estimation before SIB 2 decoding is available, depending on the DL/UL configuration used for TD-LTE. In a worst case scenario, inaccurate channel estimation in high-Doppler scenarios can lead to decoding failure of the physical downlink shared channel (PDSCH). As the PDSCH can carry the SIB 2 information elements, a decoding failure of the PDSCH can result in a SIB 2 decoding failure. For example, for an UL/DL configuration of Type 1, as illustrated in Table 220 of FIG. 2C, DL subframes occur only in subframes #0, #4, #5, and #9, while special subframes, which can include at least partial downlink information occur only in subframes #1 and #6. As indicated in FIG. 4B, subframes of an MBSFN TDD LTE frame that supports MBMS data can potentially be allocated MBMS transmissions during subframes #3, #4, #7, #8, and #9. Thus, if potential MBSFN subframes are excluded from a channel estimation process, only subframes #0, #1, #5, and #6 may be considered for the channel estimation process. Considering that there are fewer RS symbols used in special subframes, and channel estimates in high-Doppler scenarios based on special subframes can be unreliable, only the downlink subframes #0 and #5 can be considered for reliable channel estimation, which can be fewer subframes than may be desired to update channel estimation, especially in high Doppler scenarios. Thus, methods to determine whether a subframe includes MBMS data are desirable to permit the use of more subframes in channel estimation processes, particularly when the exact MBSFN pattern used by the wireless network is not yet known. A similar lack of cell specific reference signals for channel estimation as described for TDD-LTE systems can also occur with FDD-LTE systems, due to fewer available DL subframes for channel estimation when excluding all "potential" MBSFN subframes from a channel estimation process. In a worst case scenario, SIB 2 decoding failures can lead to a radio link failure (RLF), which can result in greater negative impacts to overall device performance, including impacting accessibility and throughput. As such, various example embodiments disclosed herein provide for "MBSFN-aware" channel estimation algorithms to improve the performance in advance of SIB 2 decoding.

Figure 6:
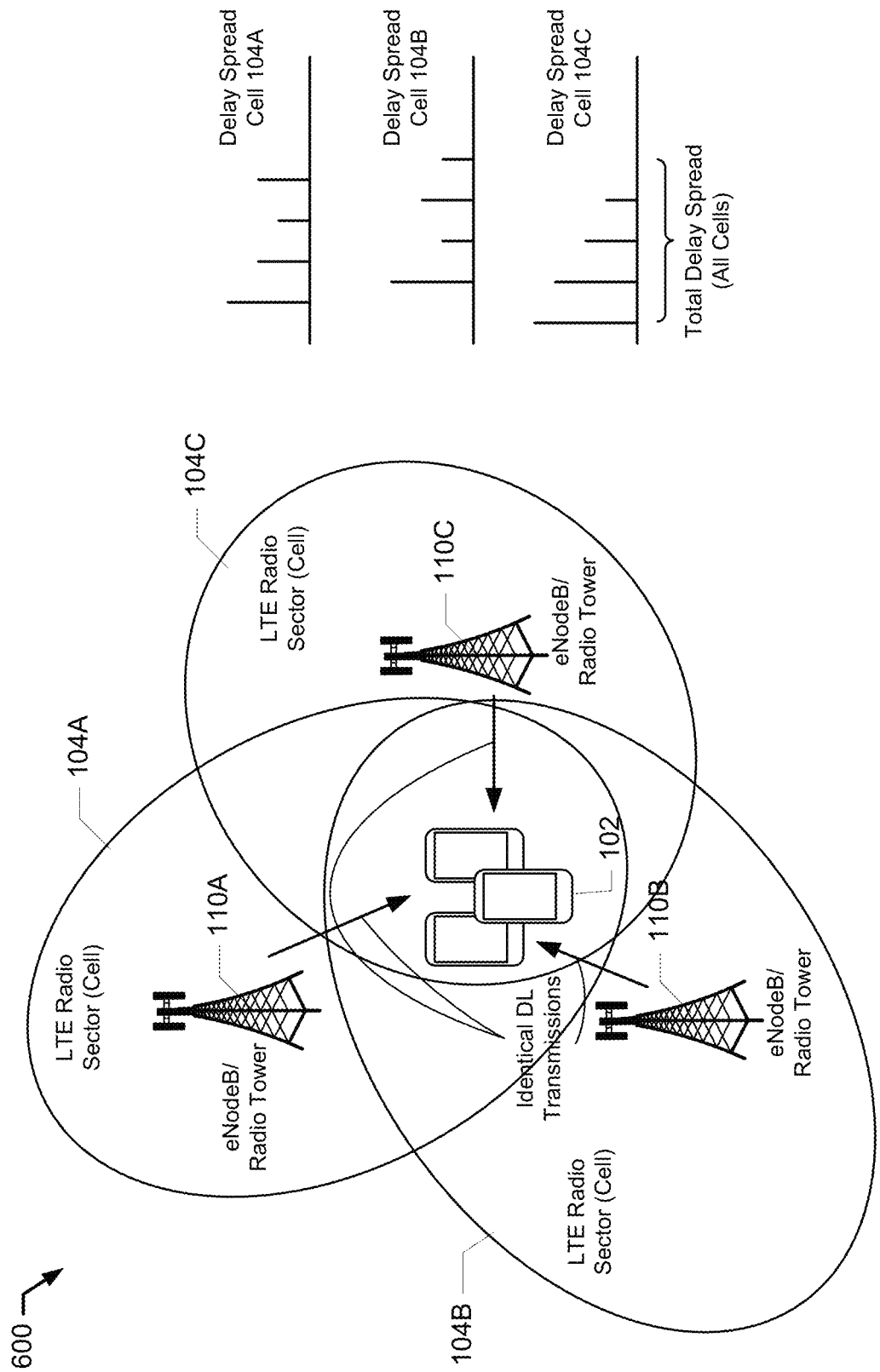
FIG. 6 illustrates an LTE wireless network system to provide an MBMS to a wireless communication device in accordance with some embodiments.

FIG. 6 illustrates a diagram 600 of a Multimedia Broadcast Multicast Services (MBMS) network that can transmit multimedia content to multiple UEs 102. In a broadcast service, multiple UEs 102 in a region served by one or more LTE radio sectors (cells) 104, can receive downlink transmissions that are identically transmitted by eNodeBs 110 of the respective LTE radio sectors 104. In a multicast service, a specific subset of UEs 102 in a region can receive the MBMS data. As illustrated in FIG. 6, a UE 102 can be positioned in a geographic area so as to receive transmissions from multiple eNodeBs 110A/B/C in overlapping LTE radio sectors 104 A/B/C. Each of the eNodeBs 110A/B/C can transmit identical MBSFN content. As communication channels between the UE 102 and each eNodeB 110A/B/C can vary in their specific characteristics, e.g., an amount of delay spread introduced by the transmission from the eNodeB 110A/B/C to the UE 102 can vary as shown in FIG. 6. The total delay spread for all eNodeB's from which the UE 102 receives the MBSFN transmissions can be greater than the individual delay spread for each of the individual transmissions. As such, an extended cyclic prefix can be used for OFDM symbols in MBSFN frames that carry the MBMS data, as indicated in FIGS. 3C and 3D.

Figure 7:
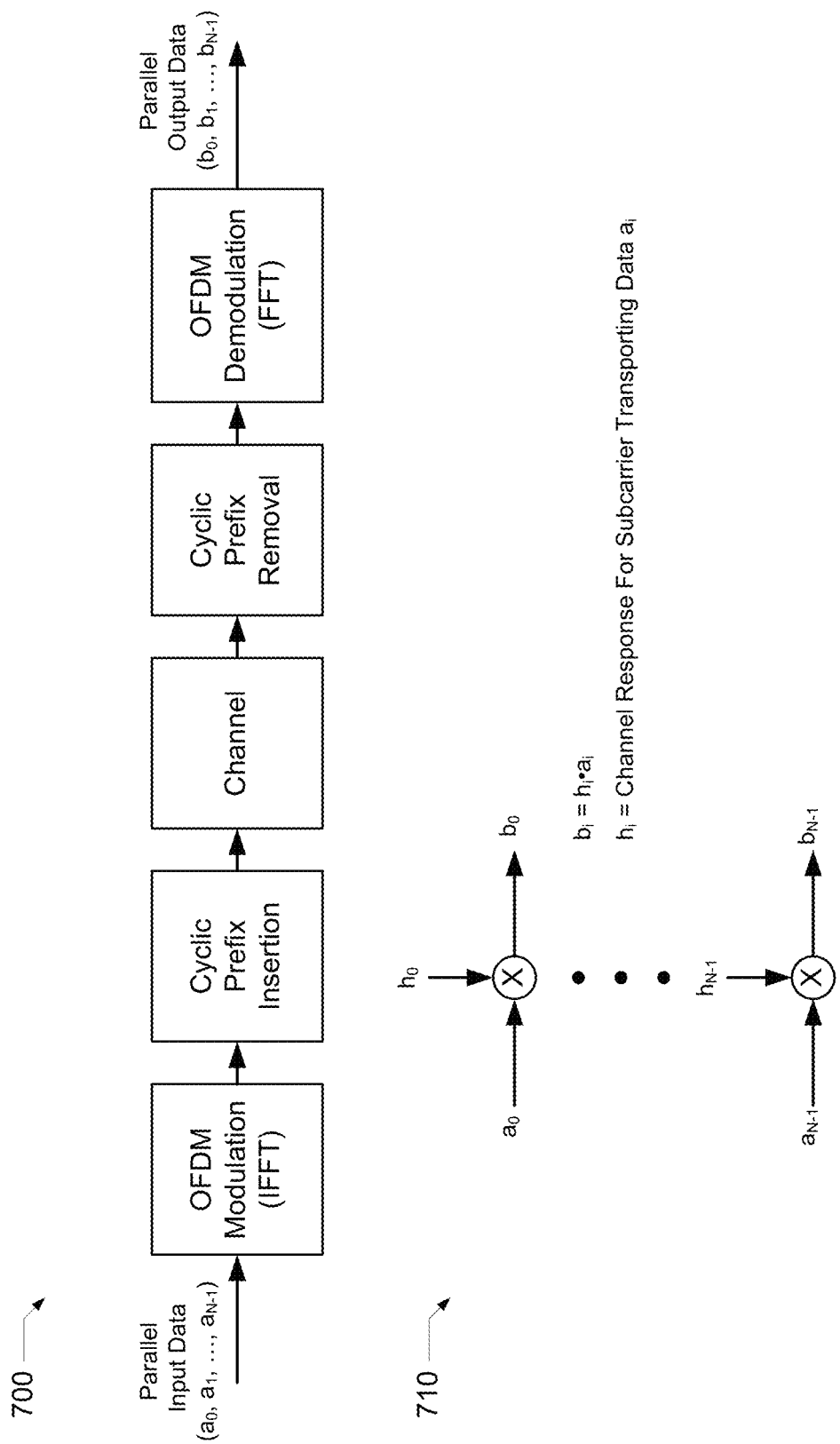
FIG. 7 illustrates a representative orthogonal frequency division multiplexing (OFDM) communication channel model in accordance with some embodiments.

Channel estimation for wireless networks that use OFDM symbols can be represented by a simplified OFDM channel model 710, as illustrated in FIG. 7. The diagram 700 in FIG. 7 illustrates select processing blocks that can be included in an OFDM transmitter and OFDM receiver. A set of parallel input data, which can include both user data and reference signals, can be mapped into an OFDM modulation function, e.g., implemented using an Inverse Fast Fourier Transform (IFFT), that outputs a set of complex values, which are expanded in the time domain by inserting a cyclic prefix (regular or extended type) and transmitted through a wireless communication channel. (A number of functions, such as D/A conversion, A/D conversion, filtering, mixing to and from radio frequencies, etc., are not shown.) At a receiver, the inserted cyclic prefix can be removed and a parallel OFDM demodulation function, e.g., implemented using a Fast Fourier Transform (FFT), can occur and produce a set of parallel output data. A relationship between the parallel output data and the parallel input data, for a communication channel with no added noise/interference can be represented by the simplified OFDM channel model 710, in which each parallel output is related to a corresponding parallel input by a complex-valued channel response, i.e., $b_i = h_i \cdot a_i$. The set of all individual subcarrier channel responses together can form the communication channel response and can be represented by a vector $h = \{h_0, \ldots, h_{N-1}\}^T$, where N represents the number of subcarriers.

In accordance with some embodiments, in order to detect an MBSFN pattern, a periodicity and an offset value for MBSFN radio frames, a number of radio frames per period, and an MBSFN subframe pattern within the one radio frame or the four radio frames of each period of the MBSFN pattern can be determined. The reference signal (RS) structural differences between reference signals used for MBSFN subframes or portions thereof (e.g., as illustrated in FIG. 3C) and cell specific reference signals used for non-MBSFN subframes (e.g., as illustrated in FIGS. 3A and 3B) can be used to detect whether a subframe is potentially an MBSFN subframe in advance of decoding SIB 2 messages. As will be described further herein, a variety of approaches can be used to detect MBSFN subframes, including approaches based on a channel energy response (CER) of OFDM symbols that include reference signals in subframes and approaches based on a cross correlation of channel impulse responses (CIRs) determined for OFDM symbols that include reference signals in a subframe.

In some embodiments, a UE 102 can initiate a channel estimation process assuming that all subframes are non-MBSFN subframes. For each subframe within a radio frame, e.g., a 10 millisecond radio frame, the UE 102 can determine whether the subframe is an MBSFN subframe. As will be described further herein below, several techniques can be used in embodiments, including some based on comparison of CERs of OFDM symbols that include reference signals in a subframe, and/or some based on a cross correlation of CIRs for one or more pairs of OFDM symbols that include reference signals in a subframe.

The UE 102 can adapt channel estimation based at least in part on detection of one or more MBSFN subframe(s). For example, in some embodiments, the UE 102 can mark radio frames (and/or subframes of the radio frames) in which MBSFN subframes are detected MBSFN frames and/or as MBSFN subframes, and a determination of an MBSFN pattern can be made for one or more potential periodicities and/or offsets by accumulating and comparing a number of MBSFN frames/subframes sufficient to detect the periodicity and/or the offset. The observations of detected MBSFN frames/subframes can be stored in a table, which can be updated based on additional detected MBSFN radio frames/subframes. The information stored in the table can be used to determine potential MBSFN patterns. When a potential MBSFN pattern is confirmed, e.g., based on a set of detected MBSFN frames/subframes, the MBSFN configuration can be assumed to apply to future frames/subframes until a new MBSFN pattern is detected. Subsequent channel estimation decisions (e.g., whether to freeze a channel estimation process for certain frames/subframes or to use certain subframes/frames to update channel estimates) can be based on the confirmed MBSFN pattern.

As listed in Table 420 of FIG. 4D and described herein, the periodicity of the MBSFN pattern can vary from occurring in every frame, in every other frame, up to every 32 frames. For longer periodicity configurations, which may require a longer time period to detect the MBSFN pattern, the detection can be limited to a time periodicity associated with the SIB 2 messages broadcast by the wireless network. In some embodiments, the UE 102 can ignore the higher order structure of the MBSFN radio frame pattern. In some embodiments, the UE 102 can determine on the fly to freeze channel estimation for a particular subframe when the particular subframe is detected to be an MBSFN subframe. Otherwise, the channel estimation process can be continued (i.e., not frozen) using subframes determined to be non-MBSFN subframes.

In some embodiments, the channel estimation and adaptation process can use a channel energy response (CER) based approach to detect MBSFN subframes. In some embodiments, a CER can be determined for each OFDM symbol that includes reference signals (or is assumed to include reference signals) in a respective subframe. The CER can be based on a channel impulse response (CIR) determined for the respective OFDM symbol. Channel energies for multiple OFDM symbols of a subframe (or for a portion of the subframe, e.g., a time slot) can be estimated and compared with one another. In some embodiments, multiple CIR paths can be calculated for each OFDM symbol, and a CER can be calculated for one or more of the multiple CIR paths. In some embodiments, a channel energy can be estimated by picking a "strongest" path for determining the CER. Additionally or alternatively, in some embodiments, the channel energy can be estimated by picking a set of M>1 strongest paths for determining the CER. In some embodiments, the channel energy can be estimated by calculating a noise floor and selecting a set of one or more paths that exceed the calculated noise floor by at least a threshold level, e.g., by a predetermined or adaptively determined level of X dB.

As illustrated in FIGS. 4A and 4B, an MBSFN subframe can include a non-MBSFN region spanning one or two OFDM symbols. Thus, at least the first OFDM symbol of an MBSFN subframe can include cell specific reference signals. The channel estimation process can determine a channel impulse response using the first OFDM symbol of the MBSFN subframe, and a corresponding CER for the first OFDM symbol can be determined from the CIR of the first OFDM symbol. In some embodiments, the CER for the first OFDM symbol (or based on one or more other OFDM symbols known to contain cell specific reference signals) can be compared to the CER for one or more remaining OFDM symbols that can potentially include either cell specific reference signals or MBSFN reference signals in the subframe. It can be assumed that OFDM symbols without reference signals, e.g., data only OFDM symbols, can have a different energy level CER than OFDM symbols that include cell specific reference signals. Similarly, it can be assumed that OFDM symbols with MBSFN reference signals have a different energy level than OFDM symbols that include cell specific reference signals. In general, it can be assumed that the total CER energy of OFDM symbols calculated based on channel energy response values for the OFDM symbols that include cell specific reference signals can be within a particular range of one another. For example, over a particular time period, the total CER energy for OFDM symbols that include cell specific reference signals can minimally vary. The channel estimation and adaptation process can track the variance of total CER energy values for different OFDM symbols and can "flag" those OFDM symbols that differ from OFDM symbols known to contain cell specific reference signals. When the total CER energy values of one or more unknown OFDM symbols in a subframe is within a threshold (e.g., a predetermined or adaptively determine level of Y db) of a total CER energy value determined for a known OFDM symbol of the subframe, e.g., the first OFDM symbol of the non-MBSFN (control) region of the subframe, the subframe can be declared as a non-MBSFN subframe. When an OFDM symbol that can potentially include cell specific reference signals is determined to have a total CER energy value that varies by more than the threshold amount from the known CER energy value of a known OFDM symbol with cell specific reference signals, the subframe can be declared as an MBSFN subframe. For example, comparing the non-MBSFN subframe 340 and the MBSFN subframe 330 illustrated in FIG. 3D, both the non-MBSFN subframe 340 and the MBSFN subframe 330 include a first OFDM symbol with cell specific reference signals. In the non-MBSFN subframe 340, the fourth, seventh, and tenth OFDM symbols (counting from left to right) also contain cell specific reference signals, while in the MBSFN subframe 330, the fourth and tenth OFDM symbols contain data only, while the seventh OFDM symbol contains MBSFN reference signals. The total channel energy for these OFDM symbols in the MBSFN subframe can vary from the total channel energy of the first OFDM symbol of the MBSFN subframe, in some embodiments, while the same OFDM symbols in the non-MBSFN subframe can be within a threshold difference of the first OFDM symbol of the non-MBSFN subframe.

As another example, in some embodiments, the CER energy of a subframe can be averaged. In some embodiments, the first OFDM symbol, which can include cell specific reference signals, can be excluded from the CER energy averaging. The CER of well-known non-MBSFN subframes (e.g., 0, 4, 5, and 9 for FDD) can be calculated. If the difference between the averaged CER energy of the subframe and the CER of the well known non-MBSFN subframes is greater than a threshold, the current subframe can be considered as a potential MBSFN subframe. Otherwise, the subframe can be considered a non-MBSFN subframe.

In some embodiments, based on CER energy calculations, the CERs of OFDM symbols in a subframe can be normalized based at least in part on the CER of the first OFDM symbol (i.e., a known OFDM symbol that includes cell specific reference signals) in the subframe.

In some embodiments, a channel estimation and adaptation process can utilize a channel impulse response (CIR) cross-correlation approach for MBSFN subframe detection. The CIRs for one or more OFDM symbols within a subframe can be determined, where the OFDM symbols are known to contain cell specific reference signals or are presumed to contain cell specific reference signals. The CIRs can, for example, be available from a channel estimation block. The CIRs can be determined based on an initial setting in which one or more subframes are non-MBSFN DL subframes. Assuming that the communication channel does not change substantially for two "consecutive" OFDM symbols that contain cell specific reference signals, e.g., when spaced by three OFDM symbols apart from each other as illustrated by the non-MBSFN subframe 340 of FIG. 3D, a cross correlation of CIRs from the "consecutive" OFDM symbols, which are presumed to contain cell specific reference signals can be used, in some embodiments, to detect the presence of an OFDM symbol that actually contains cell specific reference signals. A CIR from an OFDM symbol that is based on data only or that includes MBSFN reference signals would produce a CIR substantially different from a CIR determined for a known OFDM symbol (e.g., the first OFDM symbol of a subframe) that includes cell specific reference signals.

For example, let the vector $\vec{h}_i$ denote the channel impulse response (CIR) for the $i^{th}$ OFDM symbol, then a cross-correlation between CIRs for two different OFDM symbols, e.g., the $i^{th}$ OFDM symbol and the $j^{th}$ OFDM symbol can be represented as $\vec{h}_i * \vec{h}_j$, where * indicates the cross-correlation operation. In this regard, when a subframe is an MBSFN subframe, due to the different structures for OFDM symbols that include reference signals between MBSFN subframes and non-MBSFN subframes, the CIR for an OFDM symbol from a non-MBSFN subframe will differ substantially from the CIR for an OFDM symbol from an MBSFN subframe. For example, a channel estimation algorithm that uses for input unknown data values or uses MBSFN OFDM symbols that contain MBSFN reference signals will not produce a meaningful CIR, as the channel estimation algorithm can require that the OFDM symbols used contain cell specific reference signals. The CIR estimates from pure data symbols or from symbols with MBSFN reference signals embedded therein may instead output random "noise", which can produce a small value when performing a cross correlation of the "noise" with a known "good" CIR for the OFDM symbol that contains actual cell specific reference signals. A "noise" CIR will not cross correlate meaningfully with a "true" CIR.

In some embodiments, multiple cross-correlations can be obtained for a subframe, and the multiple cross-correlations can be filtered or averaged to produce a more reliable detection metric. For example, let a detection metric be denoted as $d_j^{CIR}$, where j indicates a subframe number. The detection metric $d_j^{CIR}$ can be compared for adjacent subframes, e.g., for the jth and (j+1)st subframes. When there is a sudden drop in the detection metric greater than a threshold (e.g., based on a difference between detection metrics calculated for adjacent subframes), the subframe can be marked as a potential MBSFN subframe. A threshold value can be defined based at least in part on a tradeoff between misdetection and false positives. In some embodiments, a threshold value for detection of potential MBSFN subframes, when using detection metrics, can as based on simulation results or can be determined using on-target testing. In some embodiments, a cross correlation of two CIRs can be normalized using the norms of the two CIRs used for calculating the cross correlation. For example, the cross correlation of the two CIRs can be divided by the norms of the two CIRs to produce a normalized cross correlation result.

In some embodiments, a channel estimation and adaptation process can be performed based at least in part on a modification of the CIR cross-correlation approach, e.g., based on a signal-to-noise ration (SNR) estimation. In this regard, an SNR estimation can be derived, in some embodiments, based at least in part on a normalized CIR cross correlation. A "per subframe" SNR estimation can in turn be obtained and used for detecting an MBSFN subframe. A thresholding algorithm can be applied to changes in SNR estimates for adjacent subframes, which can be used for MBSFN subframe detection. In this regard, when a difference between estimated SNRs for adjacent subframes is greater than a threshold, the present subframe can be considered to be an MBSFN subframe.

In low Doppler scenarios (e.g., below a threshold), the SNR estimation from adjacent non-MBSFN subframes can be averaged to assist with MBSFN detection. In high Doppler scenarios (e.g., exceeding a threshold), instantaneous subframe-based SNR estimation can be used instead of averaging the SNR estimation from adjacent non-MBSFN subframes.

Figure 8:
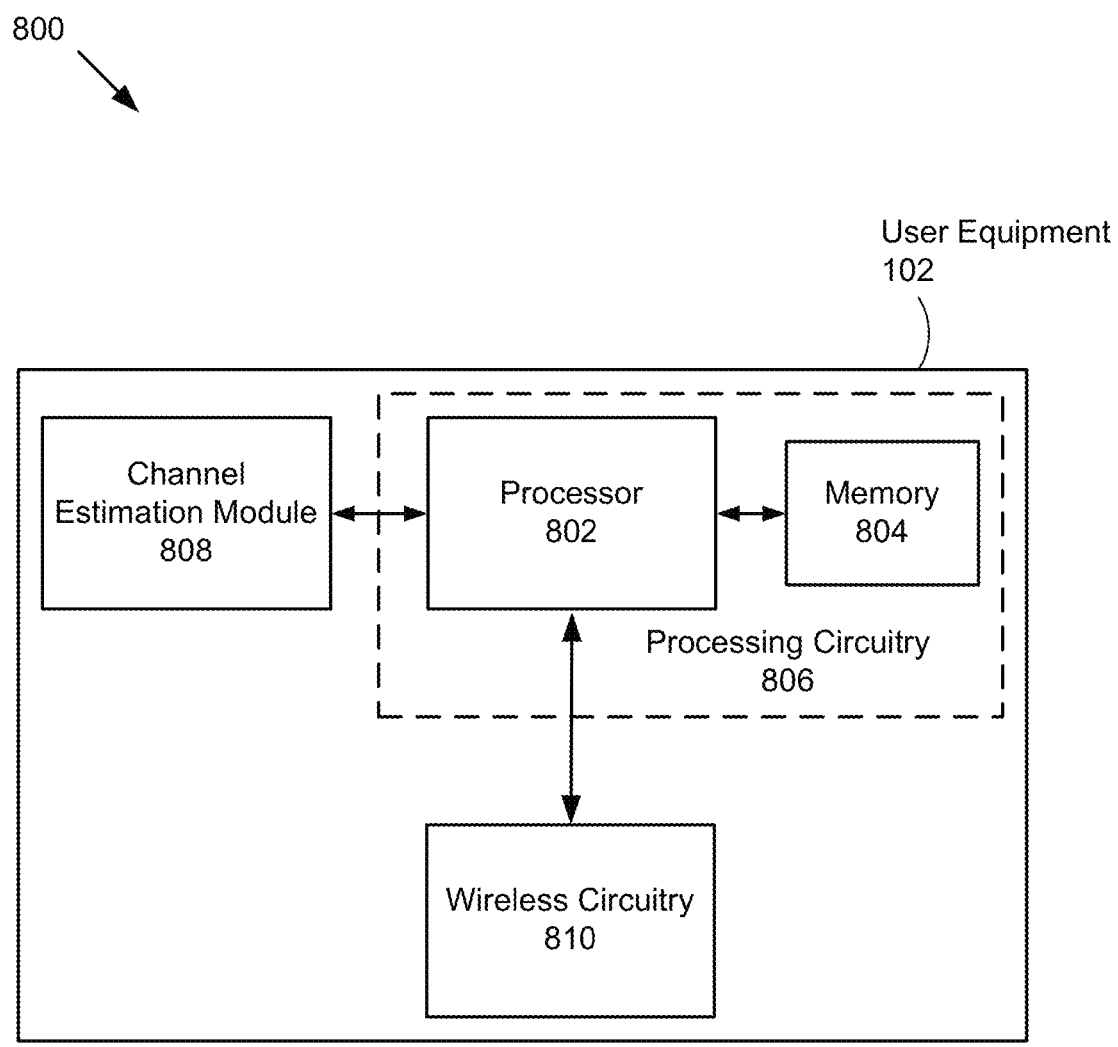
FIG. 8 illustrates a block diagram of an apparatus that can be implemented on a wireless communication device in accordance with some embodiments.

FIG. 8 illustrates a block diagram 800 of an apparatus that can be implemented on UE 102, in accordance with some embodiments. The apparatus of FIG. 8 can be configured to perform MBSFN subframe detection and channel estimation in accordance with one or more embodiments. It will be appreciated that the components, devices or elements illustrated in and described with respect to FIG. 8 may not be mandatory and thus some may be omitted in certain embodiments. Additionally, some embodiments can include further or different components, devices or elements beyond those illustrated in and described with respect to FIG. 8.

In some example embodiments, the apparatus 800 can include processing circuitry 806 that is configurable to perform actions in accordance with one or more embodiments disclosed herein. In this regard, the processing circuitry 806 can be configured to perform and/or control performance of one or more functionalities of the apparatus 800 in accordance with various embodiments, and thus can provide means for performing functionalities of the apparatus 800 in accordance with various embodiments. The processing circuitry 806 can be configured to perform data processing, application execution and/or other processing and management services according to one or more embodiments.

In some embodiments, the apparatus 800 or a portion(s) or component(s) thereof, such as the processing circuitry 806, can include one or more chipsets, which can each include one or more chips. The processing circuitry 806 and/or one or more further components of the apparatus 800 can therefore, in some instances, be configured to implement an embodiment on a chipset comprising one or more chips. In some example embodiments in which one or more components of the apparatus 800 are embodied as a chipset, the chipset can be capable of enabling a computing device, e.g., UE 102, to operate in the system 100 when implemented on or otherwise operably coupled to the computing device, e.g., UE 102. Thus, for example, one or more components of the apparatus 800 can provide a chipset configured to enable a computing device to communicate using one or more cellular wireless technologies. In some embodiments, the processing circuitry 806 can include a processor 802 and, in some embodiments, such as that illustrated in FIG. 8, can further include memory 804. The processing circuitry 806 can be in communication with or otherwise control wireless circuitry 810 and/or a channel estimation module 808.

The processor 802 can be embodied in a variety of forms. For example, the processor 802 can be embodied as various processing hardware-based means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 802 can comprise a plurality of processors. The plurality of processors can be in operative communication with each other and can be collectively configured to perform one or more functionalities of the apparatus 800 as described herein. In some embodiments, the processor 802 can be configured to execute instructions that can be stored in the memory 804 or that can be otherwise accessible to the processor 802. As such, whether configured by hardware or by a combination of hardware and software, the processor 802 can be capable of performing operations according to various embodiments while configured accordingly.

In some embodiments, the memory 804 can include one or more memory devices. Memory 804 can include fixed and/or removable memory devices. In some embodiments, the memory 804 can provide a non-transitory computer-readable storage medium that can store computer program instructions that can be executed by the processor 802. In this regard, the memory 804 can be configured to store information, data, applications, instructions and/or the like for enabling the apparatus 800 to carry out various functions in accordance with one or more example embodiments. In some embodiments, the memory 804 can be in communication with one or more of the processor 802, wireless circuitry 810, or channel estimation module 808 via one or more busses for passing information among components of the apparatus 800.

The apparatus 800 can further include wireless circuitry 810. The wireless circuitry 810 can be configured to enable the apparatus 800 to send wireless signals to and receive signals in accordance with one or more wireless networking technologies. As such, the wireless circuitry 810 can enable the apparatus 800 to send signals to and receive signals from an eNodeB 110 (or an equivalent) of a wireless network. In some embodiments, the wireless circuitry 810 includes hardware and/or software modules to perform operations to convert digital data to and/or from analog wireless radio frequency waveforms.

The apparatus 800 can further include channel estimation module 808. The channel estimation module 808 can be embodied as various means, such as circuitry, hardware, a computer program product comprising computer readable program instructions stored on a computer readable medium (for example, the memory 804) and executed by a processing device (for example, the processor 802), or some combination thereof. In some embodiments, the processor 802 (or the processing circuitry 806) can include, or otherwise control the channel estimation module 808. The channel estimation module 808 can be configured to perform and/or otherwise control channel estimation in accordance with one or more embodiments disclosed herein. Thus, for example, the channel estimation module 808 can be configured to provide means for performing one or more of the operations illustrated in and described with respect to FIGS. 9 to 13 in accordance with some embodiments.

Figure 9:
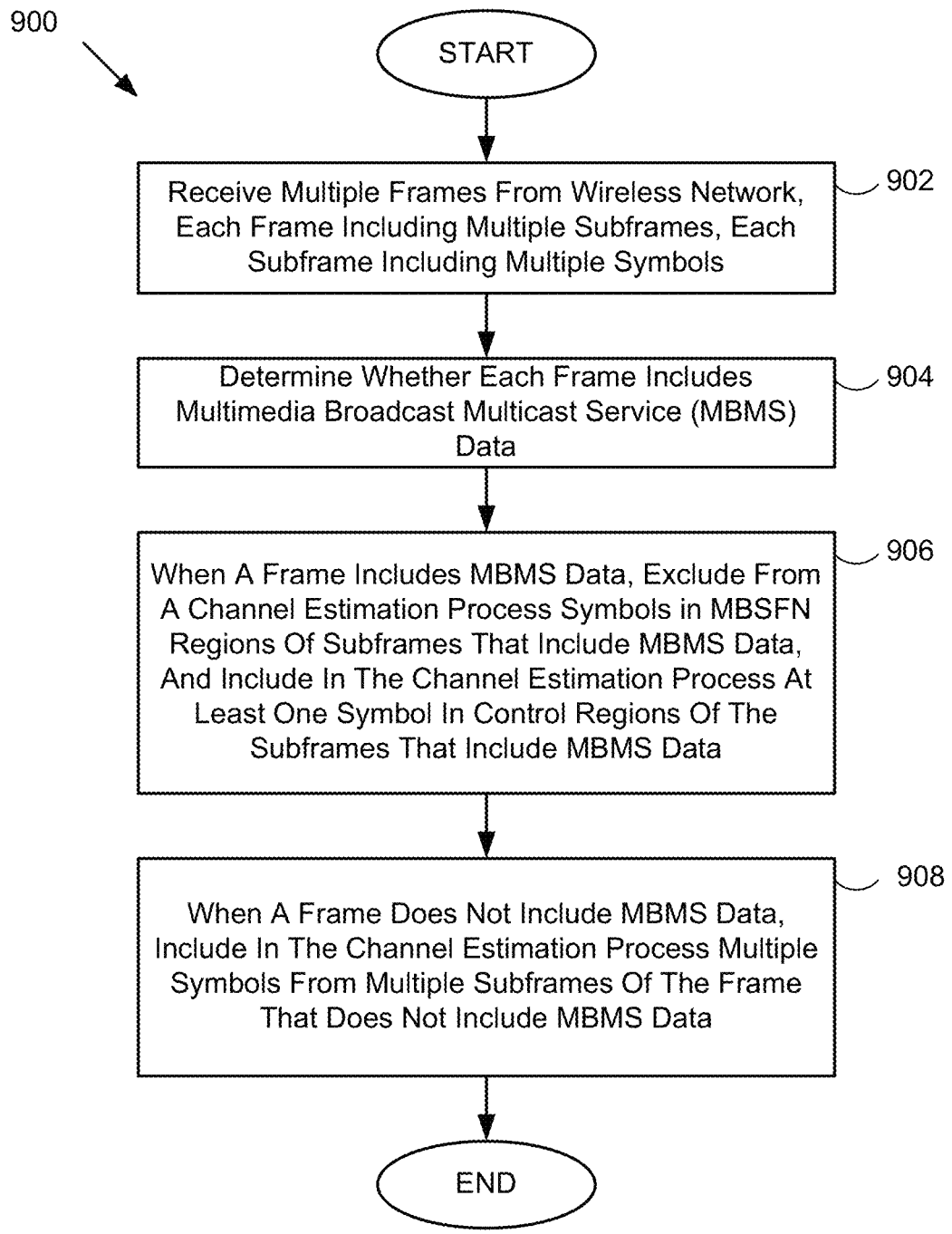
FIG. 9 illustrates a method to adapt channel estimation in a wireless communication device in accordance with some embodiments.

FIG. 9 illustrates a flowchart 900 of a method to adapt channel estimation in a wireless communication device, e.g., a UE 102, in accordance with some embodiments. In step 902, the wireless communication device can receive wireless communication formatted into multiple frames from a wireless network. Each frame can be subdivided into multiple subframes, and each subframe can include multiple symbols. In some embodiments, the frames are formatted in accordance with an LTE or LTE-Advanced wireless communication protocol. In some embodiments, some frames are formatted to support Multimedia Broadcast Multicast Service (MBMS) data, while other frames are not formatted to support MBMS data. In some embodiments, the frames formatted to support MBMS data are scheduled in accordance with an MBSFN frame/subframe pattern that includes (1) a periodicity of MBSFN frames that support MBMS data and (2) an MBSFN subframe pattern of subframes in each MBSFN frame that supports MBMS data. In some embodiments, MBSFN subframes are formatted to include MBSFN reference signals in a first set of resource elements of one or more symbols of the MBSFN subframes, while non-MBSFN subframes are formatted to include cell specific reference signals in a second set of resource elements of one or more symbols of the non-MBSFN subframes. In some embodiments, MBSFN subframes are formatted to include a non-MBSFN region that includes at least one symbol with cell specific reference signals and an MBSFN region that includes at least one symbol with MBSFN reference signals. In step 904, the wireless communication device determines whether one or more received frames include MBMS data. In some embodiments, the wireless communication device determines whether a frame includes MBMS data by comparing a first channel impulse response for at least one symbol that includes cell specific reference signals to a second channel impulse response for one or more other symbols of the subframe. In some embodiments, the wireless communication device can compare a first channel energy response for the first channel impulse response to a second channel energy response for the second channel impulse response. In some embodiments, the wireless communication device can calculate a cross correlation of the first and second channel impulse responses to determine whether the one or more other symbols of the subframe include cell specific reference signals. In step 906, when the wireless communication device determines a frame includes MBMS data, e.g., by determining that at least one subframe of the frame includes MBMS data, the wireless communication device can exclude from a channel estimation process symbols in MBSFN regions of MBSFN subframes, as the symbols in the MBSFN regions may not include cell specific reference signals that are used for the channel estimation process. The wireless communication device can also include in the channel estimation process at least one symbol from control (non-MBSFN) regions of one or more MBSFN subframes. The control (non-MBSFN) regions of MBSFN subframes can include symbols that include cell specific reference signals that can contribute to the channel estimation process. In step 908, the wireless communication device includes in the channel estimation process multiple symbols from multiple subframes of a non-MBSFN frame (i.e., a frame that does not include MBMS data).

In some embodiments, the wireless communication device initiates the channel estimation process by assuming that all received frames do not include MBMS data. The wireless communication device can subsequently determine whether each subframe in received frames include MBMS data, and the wireless communication device can adjust the channel estimation process by including or excluding symbols of subframes of frames received from the channel estimation process based at least in part on whether the subframes include MBMS data.

In some embodiments, the wireless communication device initializes a frame table maintained in storage in and/or associated with the wireless communication device, the frame table including information to indicate whether a frame includes or does not include MBMS data. In some embodiments, the frame table is initialized to indicate that all frames include MBMS data. The wireless communication device can subsequently update entries in the frame table to indicate whether a frame includes or does not include MBMS data. The wireless communication device can determine the presence or absence of MBMS data in a frame by considering symbols in subframes, e.g., using channel impulse responses and/or channel energy responses as described herein. The wireless communication device can adjust a channel estimation process to include or exclude symbols from the channel estimation process based at least in part on the determination of which frames and/or subframes include MBMS data. In some embodiments, the wireless communication device detects an MBSFN pattern, e.g., a frame pattern, a subframe pattern, etc., based on the information stored in the frame table, and uses the detected MBSFN pattern in subsequent channel estimation decisions of the channel estimation process. The MBSFN pattern can include a frame periodicity, a frame offset, a number of frames, e.g., consecutive frames, per frame period that include MBMS data, a subframe pattern of subframes within MBSFN frames, and/or a pattern of symbols within subframes that include MBMS data. In some embodiments, the MBSFN pattern includes information communicated in one or more system information block (SIB) messages, e.g., SIB 2 and/or SIB 13 messages, as described herein. In some embodiments, the wireless communication device determines the MBSFN pattern in advance of decoding the SIB 2 and/or SIB 13 messages that specify the MBSFN pattern from the wireless network.

In some embodiments, the wireless communication device determines whether a subframe of a frame includes MBMS data by determining a channel energy response (CER) for a first symbol of the subframe, where the first symbol includes cell specific reference signals. The wireless communication device can calculate the CER from a channel impulse response (CIR) for the first symbol, in some embodiments. The wireless communication device can determine additional channel energy responses (CERs) for one or more additional symbols of the subframe and then compare the first CER to at least one of the one or more additional CERs to determine whether the subframe includes MBMS data. In some embodiments, the CER for symbols that include cell specific reference signals can vary from the CER for symbols that do not include cell specific reference signals and/or include MBSFN reference signals, and the wireless communication device can determine that a subframe includes MBMS data by comparing the CERs for symbols of the subframe to observe differences in CERs. In some embodiments, the wireless communication device calculates a difference between the CER for the first symbol and the CERs for each of the additional CERs, or for at least a subset of the additional CERs. The wireless communication device can then determine that the subframe includes MBMS data when at least one of the additional CERs differs from the first CER by at least a CER difference threshold.

In some embodiments, the wireless communication device determines whether a subframe includes MBMS data by determining a reference average CER based on at least a first symbol of a reference subframe, where the reference subframe is known to not contain MBMS data. The wireless communication device can determine an average CER for other subframes based on one or more symbols of the other subframes and can exclude symbols of the other subframes that are from a control (non-MBSFN) region of the other subframes. The wireless communication device can exclude the symbols that are known to include cell specific reference signals when calculating an average CER for the subframe, and the wireless communication device can compare the calculated average CER to the reference average CER to determine whether the subframe includes MBMS data. The wireless communication device can determine that the subframe includes MBMS data when the average CER for the subframe differs from the average CER for the reference subframe by at least an average CER difference threshold.

In some embodiments, the wireless communication device determines whether a subframe includes MBMS data by determining a set of channel impulse responses (CIRs). The CIRs can be determined as part of the channel estimation process or separately. In some embodiments, the wireless communication device calculates a first CIR based on a first symbol of a subframe, where the first symbol of the subframe includes cell specific reference signals. The wireless communication device also calculates additional CIRs for one or more additional symbols of the subframe. The wireless communication device can calculate cross-correlations of the first CIR with the additional CIRs and determine whether the subframe includes MBMS data based on the cross-correlation results. In some embodiments, when at least one of the cross-correlation results for symbols of the subframe differ from an autocorrelation of the first CIR by more than a CIR difference threshold, the wireless communication device can conclude that the subframe includes MBMS data.

In some embodiments, the wireless communication device determines whether a subframe includes MBMS data by determining a reference CIR metric based on CIRs calculated for one or more symbols of a reference subframe, where the reference subframe can be known to not contain MBMS data and at least one symbol of the reference subframe includes cell specific reference signals. In some embodiments, a reference CIR metric is determined using the at least one symbol that includes cell specific reference signals. The wireless communication device can also determine a CIR metric for another subframe, different from the reference subframe, based on one or more CIRs calculated for one or more symbols of the another subframe. The CIR metric calculated for the another subframe can exclude any symbols of the another subframe in a control region of the another subframe that include cell specific reference signals. The wireless communication device can thus compare a CIR metric based on symbols with cell specific reference signals to CIR metrics based on symbols without cell specific reference signals (or at least not known a priori to include cell specific reference signals). The wireless communication device can compare the CIR metric for the "another" subframe to the reference CIR metric and determine that the "another" subframe includes MBMS data when the CIR metric differs from the reference CIR metric by at least a CIR metric threshold, e.g., a predetermined or adaptively determine level of X dB.

Figure 10:
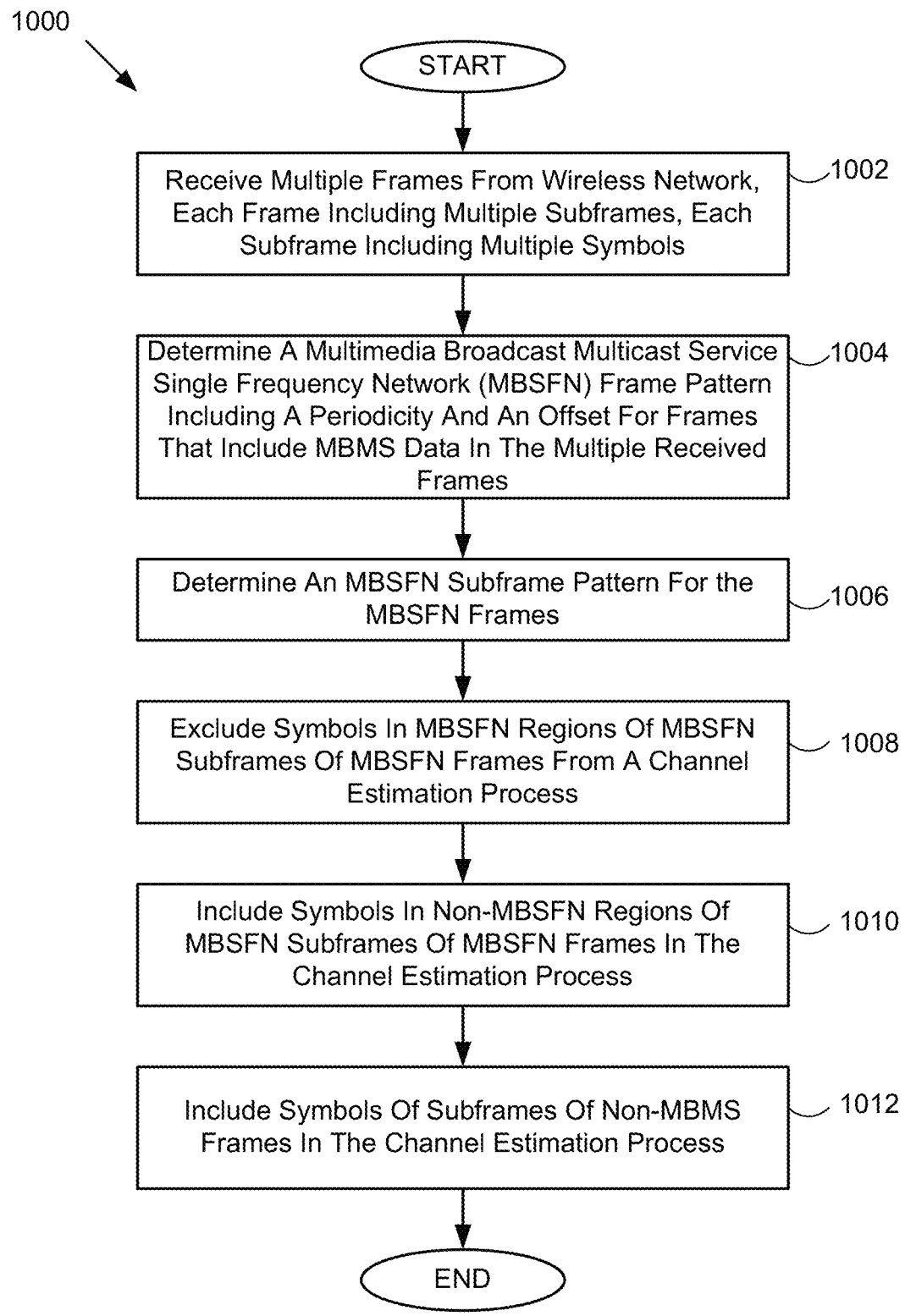
FIG. 10 illustrates another method to adapt channel estimation in a wireless communication device in accordance with some embodiments.

FIG. 10 illustrates a flowchart 1000 for a method by which a wireless communication device can adapt channel estimation in accordance with some embodiments. In step 1002, the wireless communication device receives multiple frames from a wireless network. In some embodiments, the multiple frames are formatted in accordance with an LTE and/or LTE-Advanced wireless communication protocol. In some embodiments, some of the frames include MBMS data, while other frames do not include MBMS data. Each frame includes multiple subframes, and each subframe includes multiple symbols. In frames that include MBMS data, some subframes include MBMS data, while other subframes do not include MBMS data. Each subframe can include a non-MBSFN (control) region of at least one symbol that includes cell specific reference signals. Subframes that include MBMS data include an MBSFN region that include MBSFN reference signals and do not include symbols with cell specific reference signals. In step 1004, the wireless communication device determines an MBSFN frame pattern based on the received frames. In some embodiments, the MBSFN frame pattern includes a periodicity of frames that include MBMS data. In some embodiments MBSFN frame pattern includes an offset of frames that include MBMS data within a frame period. In some embodiments, the MBSFN frame pattern includes an MBSFN subframe pattern. In step 1006, the wireless communication device determines the MBSFN subframe pattern for the frames that include MBMS data. In some embodiments, the MBSFN subframe pattern includes a first set of subframes that include MBMS data within a frame that includes MBMS data and a second set of subframes that do not include MBMS data within the frame that includes MBMS data. In step 1008, the wireless communication device excludes one or more symbols in MBSFN regions of MBSFN subframes of MBSFN frames from a channel estimation process. In some embodiments, the wireless communication device excludes symbols that include MBSFN reference signals (or are determined to potentially contain MBSFN reference signals) from the channel estimation process. In some embodiments, the wireless communication device excludes symbols that are determined to potentially not include cell specific reference signals, e.g., include only data or other reference signals that can interfere with the channel estimation process. In step 1010, the wireless communication device includes one or more symbols from a non-MBSFN (control) region of one or more MBSFN subframes of MBSFN frames in the channel estimation process. In some embodiments, the wireless communication device includes in the channel estimation process a first and/or a second symbol from a control region of the one or more MBSFN subframes, where the first and/or second symbols include cell specific reference signals. In step 1012, the wireless communication device includes one or more symbols from one or more subframes of non-MBSFN frames in the channel estimation process. In some embodiments, the one or symbols included include cell specific reference signals.

Figure 11:
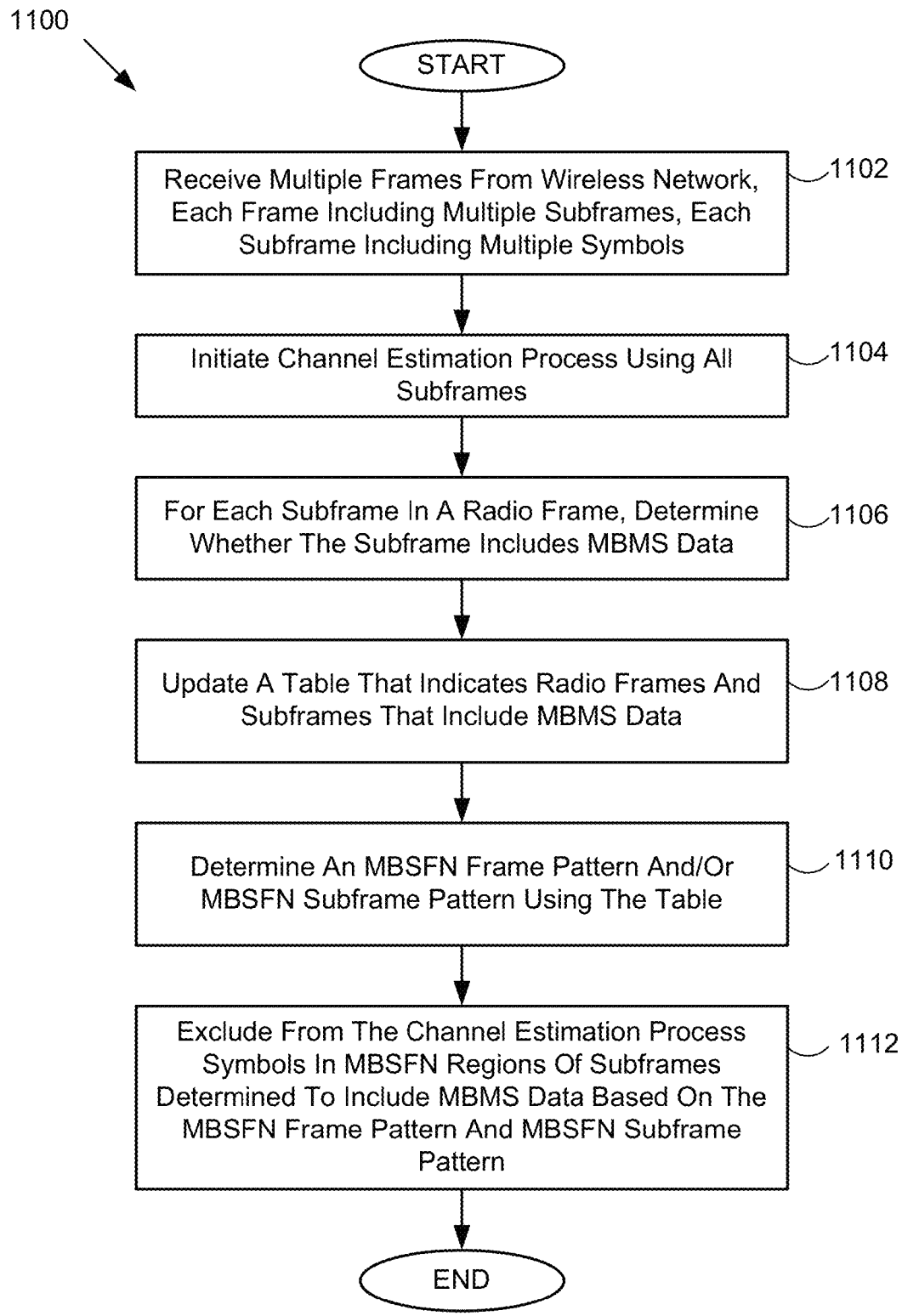
FIG. 11 illustrates a further method to adapt channel estimation in a wireless communication device in accordance with some embodiments.

FIG. 11 illustrates a flowchart 1100 of a method for adapting channel estimation in a wireless communication device in accordance with some embodiments. In step 1102, the wireless communication device receives multiple frames from a wireless network, where each frame includes multiple subframes, and each subframe includes multiple symbols. In some embodiments, the frames, subframes, and symbols are formatted in accordance with an LTE and/or LTE-Advanced wireless communication protocol. In some embodiments, some of the frames, some of the subframes, and/or some of the symbols are formatted to support a Multimedia Broadcast Multicast Service. In step 1104, the wireless communication device initiates a channel estimation process using all subframes received. In step 1104, the wireless communication device determines for each subframe of a received frame whether the subframe includes MBMS data. In some embodiments, the wireless communication device determines whether the subframe includes MBMS data based on a channel impulse response and/or a channel energy response for at least one symbol of the subframe. In some embodiments, the wireless communication device compares two CIRs for two different symbols of the subframe to determine whether the subframe includes MBMS data. In some embodiments, the wireless communication device compares a CIR for a symbol of the subframe with a CIR for a reference symbol that is known to include cell specific reference signals. In some embodiments, the wireless communication device determines whether the subframe includes MBMS data based on a channel energy response (CER) for one or more symbols of the subframe. In step 1108, the wireless communication device updates a table that indicates radio frames and subframes that include MBMS data based at least in part on the determining of step 1106. In step 1110, the wireless communication device determines an MBSFN frame pattern and/or an MBSFN subframe pattern using the information in the table. In step 1112, the wireless communication device excludes from the channel estimation process one or more symbols from subframes determined to include MBMS data.

In some embodiments, the one or more symbols excluded from the channel estimation process are within MBSFN regions of the subframes.

Figure 12:
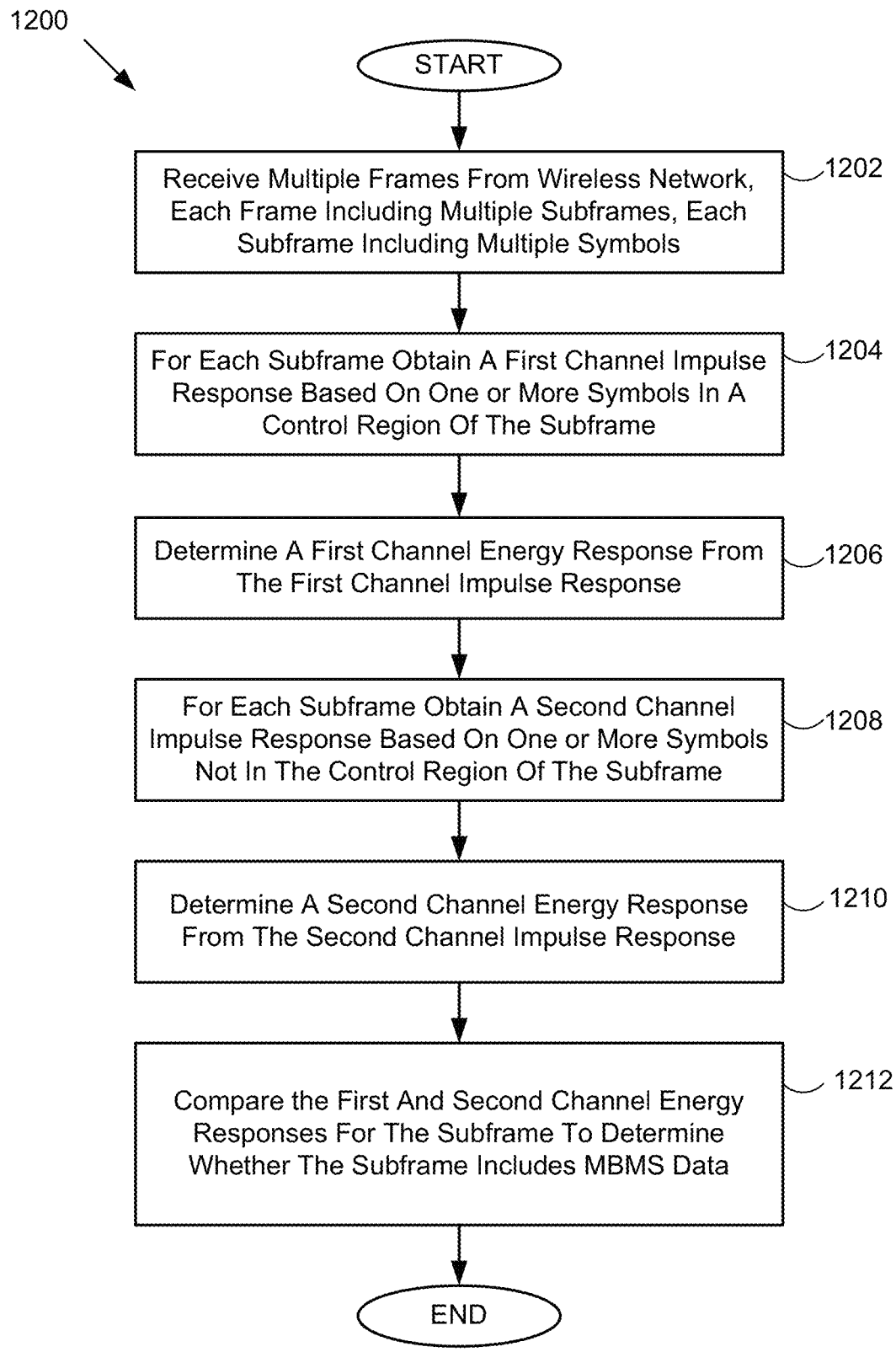
FIG. 12 illustrates a method to adapt channel estimation based on channel energy responses in a wireless communication device in accordance with some embodiments.

FIG. 12 illustrates a flowchart 1200 of a method to adapt channel estimation in a wireless communication device in accordance with some embodiments. In step 1202, the wireless communication device receives multiple frames from a wireless network, each frame including multiple subframes and each subframe including multiple symbols. In step 1204, the wireless communication device obtains a first channel impulse response (CIR) for each subframe based on one or more symbols in a control (non-MBSFN) region of the subframe. In step 1206, the wireless communication device determines a first channel energy response from the first channel impulse response for each subframe. In step 1208, the wireless communication device obtains a second channel impulse response (CIR) based on one or more symbols of the subframe that are not in the control region, e.g., in an MBSFN region. In some embodiments, the wireless communication device, the control region includes one or two symbols at known positions of the subframe, while the remaining symbols are not part of the control region. In some embodiments, the wireless communication device does not know a priori whether the subframe includes MBMS data, and therefore the wireless communication device assumes that the first one or two symbols are part of a control region, while the remaining symbols are not part of the control region and calculates the CIRs and CERs accordingly. In step 1210, the wireless communication device determines a second channel energy response based on the second channel impulse response. In step 1212, the wireless communication device compares the first and second channel energy responses to determine whether the subframe includes MBMS data. In some embodiments, the wireless communication device determines that the subframe includes MBMS data when the two CERs differ by at least a CER difference threshold.

Figure 13:
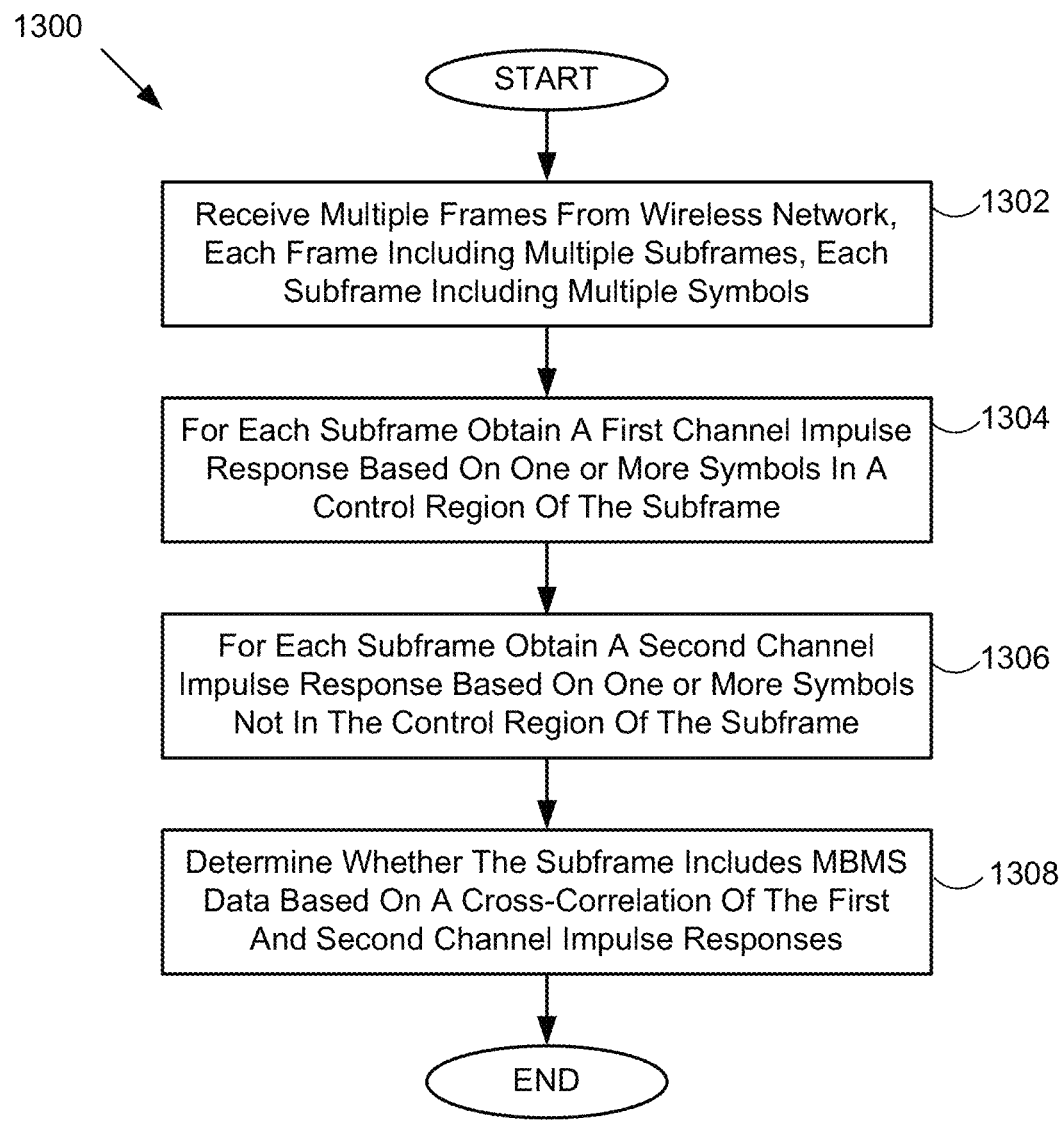
FIG. 13 illustrates a method to adapt channel estimation based on channel impulse responses in a wireless communication device in accordance with some embodiments.

FIG. 13 illustrates a flowchart 1300 of a method to adapt channel estimation in a wireless communication device in accordance with some embodiments. In step 1302, the wireless communication device receives multiple frames from a wireless network, the multiple frames each including multiple subframes, and each subframe including multiple symbols. In step 1304, the wireless communication device obtains a first channel impulse response for a subframe (or for one or more subframes or for each subframe) based on one or more symbols in an actual or potential control region of the subframe, e.g., in the first one or two symbols of the subframe. In step 1306, the wireless communication device obtains a second channel impulse response based on one or more symbols not in the actual or potential control region of the subframe, e.g., based on symbols that follow the first one or two symbols. In step 1308, the wireless communication device compares the first and second channel impulse responses to determine whether the subframe includes MBMS data. In some embodiments, the wireless communication device adapts a channel estimation process, to include and/or exclude particular symbols of particular subframes based on whether the subframes are determined to include or not include MBMS data.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for adaptive channel estimation in a wireless network configured for Multimedia Broadcast Multicast Service (MBMS), the method comprising a wireless communication device:
   receiving a plurality of frames from the wireless network, each frame comprising a plurality of subframes, each subframe comprising a plurality of symbols;
   determining whether each frame in the plurality of frames includes MBMS data by comparing, for each subframe of a frame, one or more of:
      a channel energy response (CER) of a first symbol of the subframe of the frame to CERs of one or more additional symbols of the subframe, or
      an autocorrelation of a channel impulse response (CIR) of the first symbol of the subframe of the frame to cross-correlations of the CIR of the first symbol to CIRs of one or more additional symbols of the subframe;
   excluding from a channel estimation process one or more symbols in MBMS Single Frequency Network (MBSFN) regions of one or more subframes of frames determined to include MBMS data;
   including in the channel estimation process at least one symbol in non-MBSFN regions of one or more subframes of frames determined to include MBMS data; and
   including in the channel estimation process multiple symbols from multiple subframes of frames determined to not include MBMS data.

2. The method of claim 1, further comprising the wireless communication device:
   initiating the channel estimation process assuming all frames do not include MBMS data;
   determining whether each subframe in received frames includes MBMS data; and
   adjusting the channel estimation process by including or excluding symbols from the channel estimation process based at least in part on subframes determined to include MBMS data.

3. The method of claim 2, wherein determining whether a subframe includes MBMS data comprises:
   determining a first channel energy response (CER) for a first symbol of the subframe, the first symbol including cell specific reference signals;

determining additional CERs for one or more additional symbols of the subframe;
comparing the additional CERs to the first CER to determine whether the subframe includes MBMS data.

4. The method of claim 3, wherein comparing the additional CERs to the first CER comprises:
calculating a difference between each of the additional CERs and the first CER; and
determining that the subframe includes MBMS data when at least one of the additional CERs differs from the first CER by at least a CER difference threshold.

5. The method of claim 2, wherein determining whether a subframe includes MBMS data comprises:
determining a reference average channel energy response (CER) based on at least a first symbol of a reference subframe, the reference subframe not containing MBMS data;
determining an average CER for the subframe based on one or more symbols of the subframe and excluding symbols of the subframe in a control region that includes cell specific reference signals;
comparing the average CER for the subframe to the reference average CER; and
determining the subframe includes MBMS data when the average CER for the subframe differs from the reference average CER by at least an average CER difference threshold.

6. The method of claim 2, wherein determining whether a subframe includes MBMS data comprises:
calculating a first channel impulse response (CIR) for a first symbol of the subframe, the first symbol including cell specific reference signals;
calculating additional CIRs for one or more additional symbols of the subframe;
calculating one or more cross correlations of the first CIR with the additional CIRs; and
determining the subframe includes MBMS data when at least one of the one or more cross correlations differs from an autocorrelation of the first CIR by more than a CIR difference threshold.

7. The method of claim 2, wherein determining whether a subframe includes MBMS data comprises:
determining a reference channel impulse response (CIR) metric based on CIRs calculated for one or more symbols of a reference subframe, the reference subframe not containing MBMS data and the one or more symbols including cell specific reference signals;
determining a CIR metric for the subframe based on CIRs calculated for one or more symbols of the subframe and excluding symbols of the subframe in a control region that includes cell specific reference signals;
comparing the CIR metric for the subframe to the reference CIR metric; and
determining the subframe includes MBMS data when the CIR metric differs from the reference CIR metric by at least a CIR metric threshold.

8. The method of claim 1, further comprising the wireless communication device:
initializing a frame table to indicate all frames do not include MBMS data;
updating the frame table for each frame to indicate whether the frame includes MBMS data;
detecting an MBSFN pattern from the frame table; and
using the detected MBSFN pattern in subsequent channel estimation decisions of the channel estimation process.

9. The method of claim 8, wherein the MBSFN pattern comprises a frame periodicity of frames that include MBMS data, a number of consecutive frames that include MBMS data in each frame period, and a subframe pattern of subframes that include MBMS data in each frame that includes MBMS data.

10. A wireless communication device comprising:
wireless circuitry configured to send wireless signals to and receive wireless signals from a wireless network; and
processing circuitry coupled with the wireless circuitry, wherein the processing circuitry is configured to cause the wireless communication device to at least:
receive a plurality of frames from the wireless network, each frame comprising a plurality of subframes, each subframe comprising a plurality of symbols;
determine a Multimedia Broadcast Multicast Service (MBMS) frame pattern of MBSFN frames and an MBSFN subframe pattern of MBSFN subframes based on the plurality of frames;
exclude symbols in MBMS Single Frequency Network (MBSFN) regions of MBSFN subframes from a channel estimation process;
include at least one symbol in a non-MBSFN region of MBSFN subframes in the channel estimation process; and
include one or more symbols of non-MBSFN subframes in the channel estimation process,
wherein the wireless communication device determines whether a frame of the plurality of frames includes MBMS data by comparing, for each subframe of the frame, one or more of:
a channel energy response (CER) of a first symbol of the subframe of the frame to CERs of one or more additional symbols of the subframe, or
an autocorrelation of a channel impulse response (CIR) of the first symbol of the subframe of the frame to cross-correlations of the CIR of the first symbol to CIRs of one or more additional symbols of the subframe.

11. The wireless communication device of claim 10, wherein the processing circuitry is further configured to cause the wireless communication device to:
initiate the channel estimation process assuming all frames do not include MBMS data; and
determine whether each subframe in received frames includes MBMS data.

12. The wireless communication device of claim 10, wherein the processing circuitry is further configured to cause the wireless communication device to:
initialize a frame table to indicate all frames do not include MBMS data;
update the frame table for each frame received to indicate whether the frame includes MBMS data;
determine the MBSFN frame pattern of MBSFN frames from the frame table; and
use the detected MBSFN frame pattern in subsequent channel estimation decisions of the channel estimation process.

13. The wireless communication device of claim 12, wherein the processing circuitry is further configured to cause the wireless communication device to:
update the frame table for each subframe of each frame to indicate whether the subframe includes MBMS data; and
determine the MBSFN subframe pattern based on the frame table.

14. The wireless communication device of claim 10, wherein symbols included in the channel estimation process include cell specific reference signals, while symbols excluded from the channel estimation process do not include cell specific reference signals.

15. The wireless communication device of claim 10, wherein the non-MBSFN region of MBSFN subframes includes at least one orthogonal frequency division multiplexing (OFDM) symbol that includes cell specific reference signals, and an MBSFN region of MBSFN subframes includes at least one OFDM symbol that includes MBSFN reference signals.

16. The wireless communication device of claim 10, wherein the MBSFN frame pattern includes a periodicity of frames that include MBMS data, a number of consecutive frames that include MBMS data in each frame period, and a subframe pattern of subframes that include MBMS data in each frame that includes MBMS data.

17. The wireless communication device of claim 10, wherein the processing circuitry is further configured to cause the wireless communication device to:
    determine a first channel energy response (CER) for a first symbol of each subframe, the first symbol including cell specific reference signals;
    determine additional CERs for one or more additional symbols of each subframe;
    compare the additional CERs to the first CER to determine for each subframe whether the subframe includes MBMS data.

18. The wireless communication device of claim 10, wherein the processing circuitry is further configured to cause the wireless communication device to:
    calculate a first channel impulse response (CIR) for a first symbol of each subframe, the first symbol including cell specific reference symbols;
    calculate additional CIRs for one or more additional symbols of each subframe;
    calculate one or more cross correlations of the first CIR with the additional CIRs; and
    determine whether the subframe includes MBMS data when at least one of the one or more cross correlations differs from an autocorrelation of the first CIR by more than a CIR difference threshold.

19. The wireless communication device of claim 10, wherein the processing circuitry is further configured to cause the wireless communication device to:
    determine the MBSFN frame pattern and the MBSFN subframe pattern based on comparing one or more channel impulse responses (CIRs) calculated for one or more symbols of each subframe.

20. A non-transitory computer readable storage medium having computer program code stored thereon, the computer program code comprising program code, which, when executed by one or more processors of a wireless communication device, causes the wireless communication device to perform a method comprising:
    receiving a plurality of frames from a wireless network, each frame comprising a plurality of subframes, each subframe comprising a plurality of symbols;
    determining a Multimedia Broadcast Multicast Service Single (MBMS) Frequency Network (MBSFN) frame pattern of MBSFN frames and an MBSFN subframe pattern of MBSFN subframes based on the plurality of frames; and
    adjusting a channel estimation process based on the MBSFN frame pattern and the MBSFN subframe pattern,
        wherein the wireless communication device determines whether a frame of the plurality of frames includes MBMS data by comparing, for each subframe of the frame, one or more of:
            a channel energy response (CER) of a first symbol of the subframe of the frame to CERs of one or more additional symbols of the subframe, or
    an autocorrelation of a channel impulse response (CIR) of the first symbol of the subframe of the frame to cross-correlations of the CIR of the first symbol to CIRs of one or more additional symbols of the subframe.

* * * * *